United States Patent
Liu et al.

(10) Patent No.: US 8,890,922 B2
(45) Date of Patent: Nov. 18, 2014

(54) VIDEO COMMUNICATION METHOD, DEVICE AND SYSTEM

(75) Inventors: Yuan Liu, Shenzhen (CN); Guangyao Zhao, Shenzhen (CN); Jing Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 196 days.

(21) Appl. No.: 13/561,928

(22) Filed: Jul. 30, 2012

(65) Prior Publication Data

US 2012/0287222 A1 Nov. 15, 2012

Related U.S. Application Data

(63) Continuation of application No. PCT/CN2010/070427, filed on Jan. 29, 2010.

(51) Int. Cl.
*H04N 7/14* (2006.01)
*H04N 5/232* (2006.01)
*H04N 5/262* (2006.01)
*G09G 5/00* (2006.01)
G09G 5/377 (2006.01)
G03B 17/17 (2006.01)
G03B 37/04 (2006.01)

(52) U.S. Cl.
CPC ........... *H04N 7/142* (2013.01); *H04N 5/23238* (2013.01); *H04N 5/2625* (2013.01); *G09G 5/003* (2013.01); G09G 5/377 (2013.01); G09G 2320/0673 (2013.01); G09G 2370/025 (2013.01); G09G 2370/20 (2013.01); G03B 17/17 (2013.01); G03B 37/04 (2013.01)
USPC .................. 348/14.07; 348/14.08; 348/14.12; 348/14.16

(58) Field of Classification Search
CPC . H04N 5/23238; H04N 5/2625; H04N 7/142; G09G 5/003; G09G 2320/0673; G09G 2370/025; G09G 2370/70; G09G 5/377; G03B 37/04; G03B 17/17

USPC .......................................... 348/14.01–14.16
See application file for complete search history.

(56) References Cited

U.S. PATENT DOCUMENTS 8,212,855 B2 * 7/2012 Gupta et al. ............... 348/14.08
2002/0180727 A1 12/2002 Guckenberger et al.

(Continued)

FOREIGN PATENT DOCUMENTS

CN 1725851 A 1/2006
CN 1972431 A 5/2007

(Continued)

OTHER PUBLICATIONS

Written Opinion of the International Searching Authority issued in corresponding PCT Patent Application No. PCT/CN2010/070427, mailed Nov. 4, 2010.

(Continued)

*Primary Examiner* — Melur Ramakrishnaiah
(74) *Attorney, Agent, or Firm* — Brinks Gilson & Lione

(57) ABSTRACT

In the field of communication, embodiments of the present invention provide a video communication method, device and system. The technical solutions provided by the present invention include: at least two local video cameras, configured to shoot at least two channels of local video images; an apparatus for local shooting, stitching, and fusing, configured to fuse the at least two channels of local video images, generate a panoramic video image, encode the panoramic video image into a video code stream, and transmit the video code stream to a video communication site at a remote end; a local display fusing apparatus, configured to obtain at least two channels of video data by decoding a video code stream received from the remote end, fuse the at least two channels of video data, and output the fused video data to local display apparatuses for display.

34 Claims, 19 Drawing Sheets

(56) References Cited

U.S. PATENT DOCUMENTS

| | | |
|---|---|---|
| 2005/0141607 A1 | 6/2005 | Kaplinsky |
| 2008/0158375 A1* | 7/2008 | Kakkori et al. ............ 348/222.1 |
| 2009/0058988 A1 | 3/2009 | Strzempko et al. |
| 2010/0017047 A1* | 1/2010 | Sanders-Reed .................. 701/3 |
| 2010/0128105 A1* | 5/2010 | Halavy ....................... 348/14.05 |
| 2010/0157022 A1* | 6/2010 | Choi et al. ...................... 348/48 |
| 2011/0007127 A1 | 1/2011 | Gorzynski et al. |
| 2012/0033030 A1 | 2/2012 | Liu et al. |

FOREIGN PATENT DOCUMENTS

| | | |
|---|---|---|
| CN | 101483758 A | 7/2009 |
| CN | 101534413 A | 9/2009 |
| JP | 7135646 A | 5/1995 |
| WO | WO 2008115416 A1 | 9/2008 |
| WO | WO 2009117005 A1 | 9/2009 |

OTHER PUBLICATIONS

International Search Report issued in corresponding PCT Patent Application No. PCT/CN2010/070427, mailed Nov. 4, 2010.

Brown et al., "Recognising Panoramas" Department of Computer Science, University of British Columbia. Vancouver, Canada, 2003.

Levin et al., "Seamless Image Stitching in the Gradient Domain" School of Computer Science and Engineering, The Hebrew University of Jerusalem. Jerusalem, Israel, 2006.

Szeliski et al., "Fast Poisson Blending using Multi-Splines" Microsoft Research and Microsoft, IEEE 2011.

Extended European Search Report issued in corresponding European Patent Application No. 10844382.1, mailed Jun. 6, 2013, 6 pages.

* cited by examiner

VIDEO COMMUNICATION METHOD, DEVICE AND SYSTEM

CROSS-REFERENCE TO RELATED APPLICATIONS

This application is a continuation of International Application No. PCT/CN2010/070427, filed on Jan. 29, 2010, which is hereby incorporated by reference in its entirety.

FIELD OF THE INVENTION

The present invention relates to the field of communications, and in particular, to a video communication method, device, and system.

BACKGROUND OF THE INVENTION

A general layout of a telepresence conference system in the prior art is as shown in FIG. 1. The system includes three large-screen displays 1, 2 and 3, and three high definition video cameras 4, 5 and 6 for shooting conference participants 14 to 19 sitting before a conference table 8. Each display displays a part of the conference participants. For example, each display displays two conference participants. Content displayed by three displays forms a complete conference scene.

During the implementation of the present invention, the inventor finds that the prior art has at least the following problems: Differences exist between multiple video cameras and multiple display apparatuses, so that images are different from one another in brightness and color, and an image transition difference exists at the junction of each two images. For example, in FIG. 1, the limitation of placement of the video cameras 4 and 5 causes missing or overlapping of shooting areas of the two adjacent video cameras. For example, the video camera 4 may shoot a part of an image of 16, or 5 may shoot a part of an image of 15, or the video cameras 4 and 5 both miss an area between 15 and 16, thereby causing a final image display effect to be not ideal, and failing to provide a user with seamless panoramic experience.

SUMMARY OF THE INVENTION

Embodiments of the present invention provide a video communication method, device and system, so as to generate a panoramic video image of large coverage and high resolution and perform seamless presence, thereby providing a user with better immersive panoramic experience.

In order to achieve the objectives, embodiments of the present invention adopt the following technical solutions.

A video communication site, includes:

at least two local video cameras, configured to direct at least two local user parts, and shoot at least two channels of local video images of the local user parts;

an apparatus for local shooting, stitching, and fusing, configured to fuse the shot at least two channels of local video images of the local user parts according to a fusion parameter among first video processing parameters to generate a panoramic video image; and encode the panoramic video image into a video code stream, and transmit the video code stream to a video communication site at a remote end;

a local display fusing apparatus, configured to obtain at least two channels of video data by decoding a video code stream received from the remote end, fuse the obtained at least two channels of video data according to a fusion parameter among second video processing parameters, and output the fused at least two channels of video data to local display apparatuses; and at least two local display apparatuses, configured to display the at least two channels of video data fused by the local display fusing apparatus.

A video communication method is provided, which includes:

obtaining at least two channels of local video images;

fusing the at least two channels of local video images according to a fusion parameter among first video processing parameters, so as to generate a panoramic video image; and transmitting the panoramic video image to a video encoder, encoding the panoramic video image into a video code stream through the video encoder, and transmitting the video code stream.

A video communication method is further provided, which includes:

obtaining at least two channels of video data, which is decoded by a video decoder from a video code stream, where the video code stream is received by the video decoder from a video communication site at a remote end;

fusing the at least two channels of video data according to a fusion parameter among second video processing parameters; and outputting the fused at least two channels of video data to display apparatuses, so that the display apparatuses display the fused at least two channels of video data.

A video communication device is further provided, which includes:

a first obtaining unit, configured to obtain at least two channels of local video images;

a first fusion unit, configured to fuse, according to a fusion parameter among first video processing parameters, the at least two channels of local video images obtained by the first obtaining unit, so as to generate a panoramic video image; and a first transmitting unit, configured to transmit a panoramic video image obtained by the first fusion unit to a video encoder, encode the panoramic video image into a video code stream through the video encoder, and transmit the video code stream.

A video communication device is further provided, which includes:

a second obtaining unit, configured to obtain at least two channels of video data, which is decoded by a video decoder from a video code stream, where the video code stream is received by the video decoder from a video communication site at a remote end;

a second fusion unit, configured to fuse, according to a fusion parameter among second video processing parameters, the at least two channels of video data obtained by the second obtaining unit; and an output unit, configured to output the at least two channels of video data fused by the second fusion unit to display apparatuses, so that the display apparatuses display the fused at least two channels of video data.

A video communication system includes at least two video communication sites. One of the at least two video communication sites is configured to shoot at least two channels of local video images of local user parts; fuse the shot at least two channels of local video images of the local user parts according to a fusion parameter among first video processing parameters to generate a panoramic video image; and encode the panoramic video image into a video code stream, and transmit the video code stream through a network. At least one of the at least two video communication sites acts as a receiving site, and is configured to obtain at least two channels of video data by decoding the received video code stream, fuse the obtained at least two channels of video data according to a fusion parameter among second video processing parameters, and output the fused at least two channels of video data for display.

In the video communication method, device and system provided by the embodiments of the present invention, at the transmitting end of the video communication, obtained at least two channels of video images are fused into a panoramic video image. The fused panoramic video image can reflect a junction area position relationship between adjacent video images more realistically, so that the finally displayed image provides a user with more real panoramic experience, thereby solving the problem that adjacent video images shot by the video cameras have an overlapping or missing area at the junction thereof and are not consistent in brightness and color. In the embodiment of the present invention, after the video communication transmitting end encodes the fused panoramic video image into a video code stream, and transmits the video code stream to the video communication receiving end. The video communication receiving end performs further fusion processing on the video code stream, and outputs the fused video image to display apparatuses for display. The fusion processing performed by the video communication receiving end may enable multiple projected images to be presented on a screen seamlessly and differences between projection areas to be small in color and brightness, thereby improving visual continuity of the panoramic video image and providing the user with better immersive panoramic experience.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
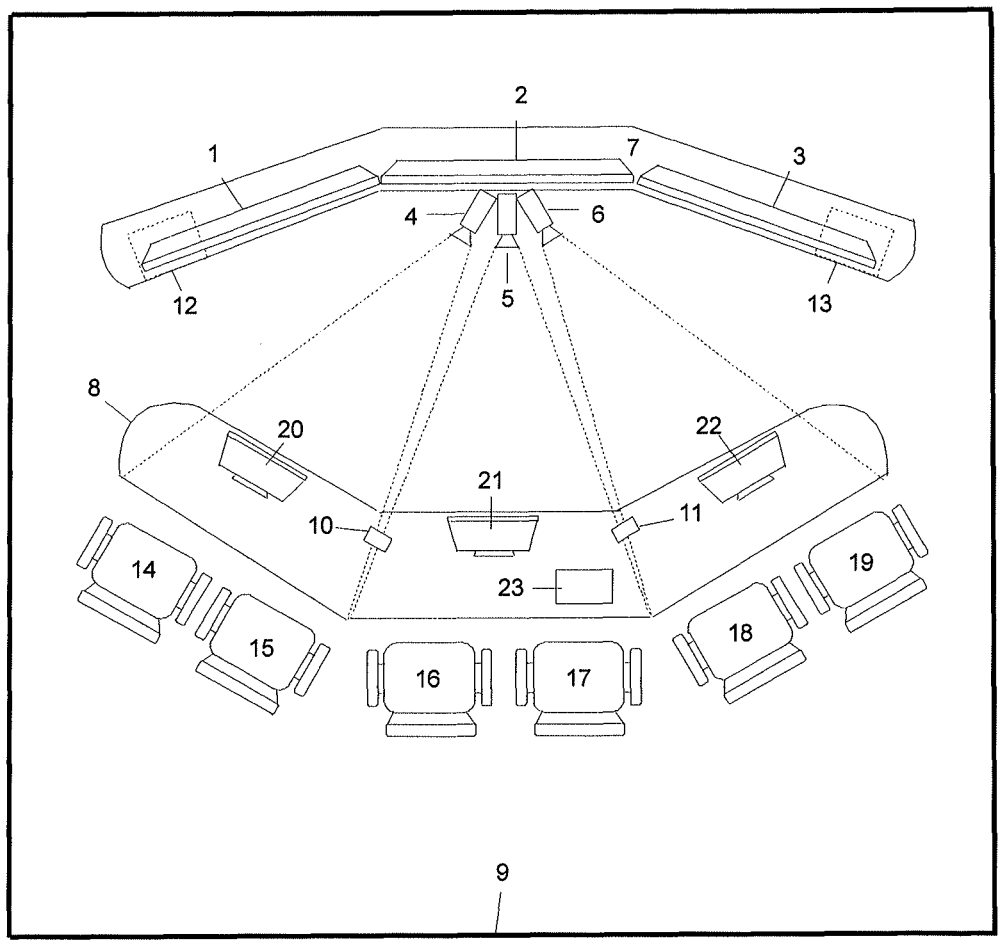
FIG. 1 is a schematic diagram of a layout of a video communication system in the prior art.

In order to make the objectives, technical solutions, and advantages of the embodiments of the present invention more comprehensible, the technical solutions in the embodiment of the present invention are clearly and completely described in the following with reference to the accompanying drawings in the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

The following embodiments are all illustrated by using an example in which the method is applied in a video conference scenario.

A video communication site, includes:

at least two local video cameras, configured to direct at least two local user parts, and shoot at least two channels of local video images of the local user parts, where in the embodiment of the present invention, the at least two local video cameras each are a co-optical-center video camera having three chassis, and synchronization of shooting time between the chassis is achieved through the same synchronization clock;

an apparatus for local shooting, stitching, and fusing, configured to fuse the shot at least two channels of local video images of the local user parts according to a fusion parameter among first video processing parameters to generate a panoramic video image; and encode the panoramic video image into a video code stream, and transmit the video code stream to a video communication site at a remote end; where in the embodiment of the present invention, the first video processing parameters are calculated by the apparatus for local shooting, stitching, and fusing, or are calculated by a PC device and then transmitted to the apparatus for local shooting, stitching, and fusing, the PC device is connected to the apparatus for local shooting, stitching, and fusing, and the first video processing parameters include: the fusion parameter, a GAMMA correction parameter, a dead pixel compensation parameter, a transformation parameter, and an area trimming parameter;

a local display fusing apparatus, configured to obtain at least two channels of video data by decoding a video code stream received from the remote end, fuse the obtained at least two channels of video data according to a fusion parameter among second video processing parameters, and output the fused at least two channels of video data to local display apparatuses; where in the embodiment of the present invention, the second video processing parameters are calculated by the local display fusing apparatus, or are calculated by a PC device and then transmitted to the local display fusing apparatus, the PC device is connected to the local display fusing apparatus, and the second video processing parameters include: the fusion parameter, a GAMMA correction parameter, a projection correction parameter, a transformation parameter, and an area trimming parameter; and at least two local display apparatuses, configured to display the at least two channels of video data fused by the local display fusing apparatus, where in the embodiment of the present invention, each of the at least two local display apparatuses may be a projector and a screen, or a display; a screen may be an oval screen, or a parabolic screen, or a polygon face screen, or a straight screen, and the display is generally a high definition flat panel display, so as to obtain a high definition video image.

On the video communication site provided by the embodiment of the present invention, at least two local video cameras obtain at least two channels of local video images, the obtained at least two channels of local video images are fused into a panoramic video image, and the fused panoramic video image can reflect a junction area position relationship between adjacent video images more realistically, so that the finally displayed image provides a user with more real panoramic experience, thereby solving the problem that adjacent video images shot by the video cameras have an overlapping or missing area at the junction thereof and are not consistent in brightness and color. Further, the local display fusing apparatus receives the video code stream from the remote end, performs further fusion processing on the video code stream, and outputs the video data after the fusion processing to the display apparatuses for display. The fusion processing may enable multiple projected images to be presented on a screen seamlessly, and differences between projection areas to be small in color and brightness, thereby improving visual continuity of the panoramic video image and providing the user with better immersive panoramic experience.

Figure 2:
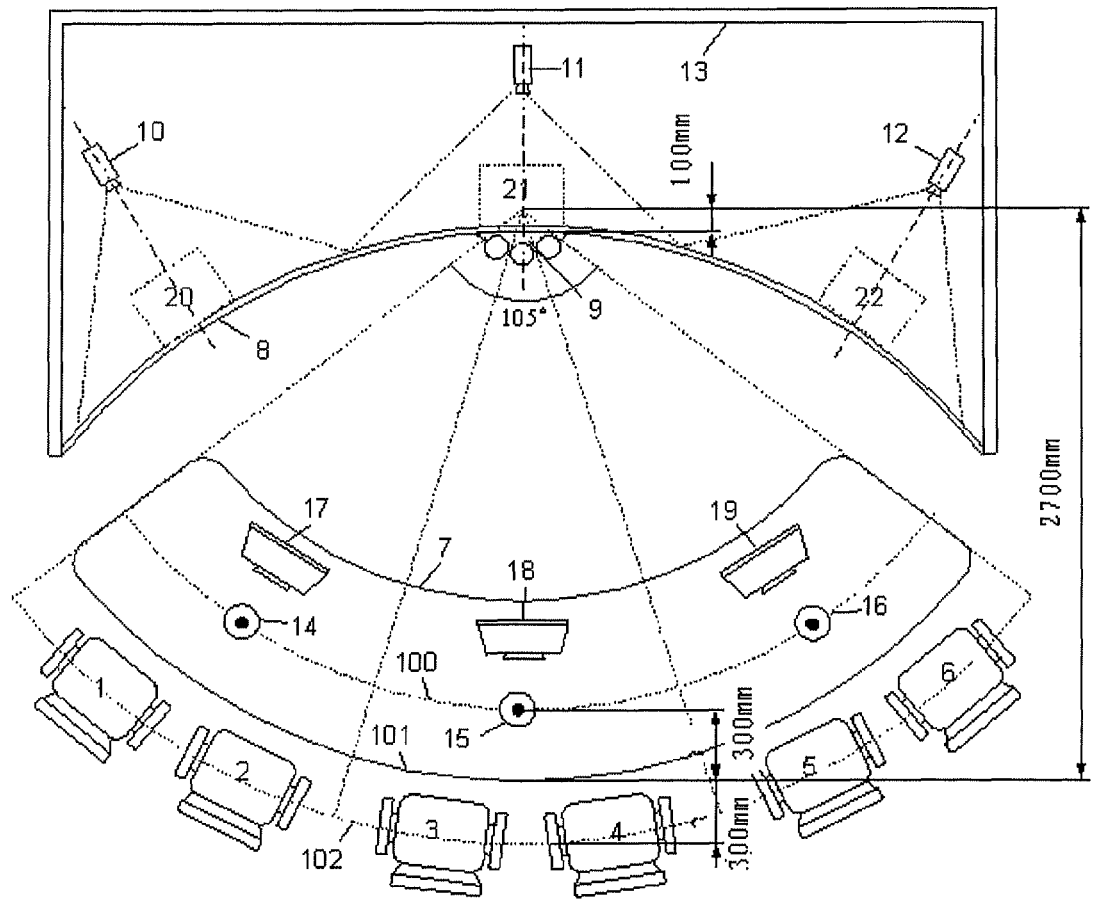
FIG. 2 is a first top diagram of a layout of a video communication system provided by an embodiment of the present invention.

FIG. 2 is a top diagram of an overall layout of a video conference system according to the present invention, which includes a co-optical-center video camera 9, configured to collect image data of a conference scene and obtain three video images, where shooting time of each chassis of the co-optical-center video camera is synchronized and the synchronization is achieved through the same synchronization clock; an arc-shaped conference table 7 and multiple user seats 1 to 6, where the user refers to one or more individuals presenting a video conference or a group of individuals, the user participates in a conversation as a speaker or as a non-speaker during the video conference; and an arc screen 8 and three projectors 10, 11 and 12, configured to display three channels of video images processed by a display fusing apparatus and shared data information. A shooting area of the video camera is a union of shooting areas of the three local video cameras. A range of the angle of view of video cameras depends on the number of the video cameras and a shooting angle of each video camera. In the embodiment of the present invention, three video cameras exist. The angle of view of each video camera ranges from 30° to 45°, so that the range of the angle of view is 90° to 135°. Preferably, the angle of view of the video camera is selected to be 35°, and the range of the angle of view of the video cameras is a circular arc of 105°. The projection screen takes a midpoint of an edge of the conference table as the center of the circle, and the radius is between 2,500 millimeters and 7,500 millimeters. Preferably, the radius of the projection screen is 2,700 millimeters. The arc length of the projection screen is determined according to the range of the angle of view of the video cameras and the radius of the projection screen. The height of the projection screen and the arc length of the projection screen depend on a ratio of a video image. Preferably, the arc length of the projection screen is about 4,950 millimeters, and the height is about 900 millimeters. The design of the parameters ensures a life-size visual effect. In the figure, a position 101 on the edge of the table surface obtains an image about 1:1 on the display. Being closer to the video camera, a position 100 may obtain a projected image about 1.1:1. In contrast, a position 102 obtains a projected image about 0.9:1. A virtual optical center of the video camera 9 and the center of an upper surface of the projection screen 8 are on the same vertical line, and the distance of the vertical line is about 100 millimeters. 13 represents a rear projection box, which accommodates three projectors 10, 11 and 12. The projectors project the image on the arc screen 8 by rear projection. The rear projection box may be designed to be a darkroom, so as to enable an image on the arc screen 8 to be affected by external light as less as possible, thereby achieving a better projection effect. Definitely, besides the rear projection, the image may also be displayed by front projection. Numbers 14, 15 and 16 represent three microphones, which are configured to collect local audio signals. Numbers 20, 21 and 22 represent three speakers, which are configured to output a remote end conference site audio signal transmitted through a network.

Figure 3:
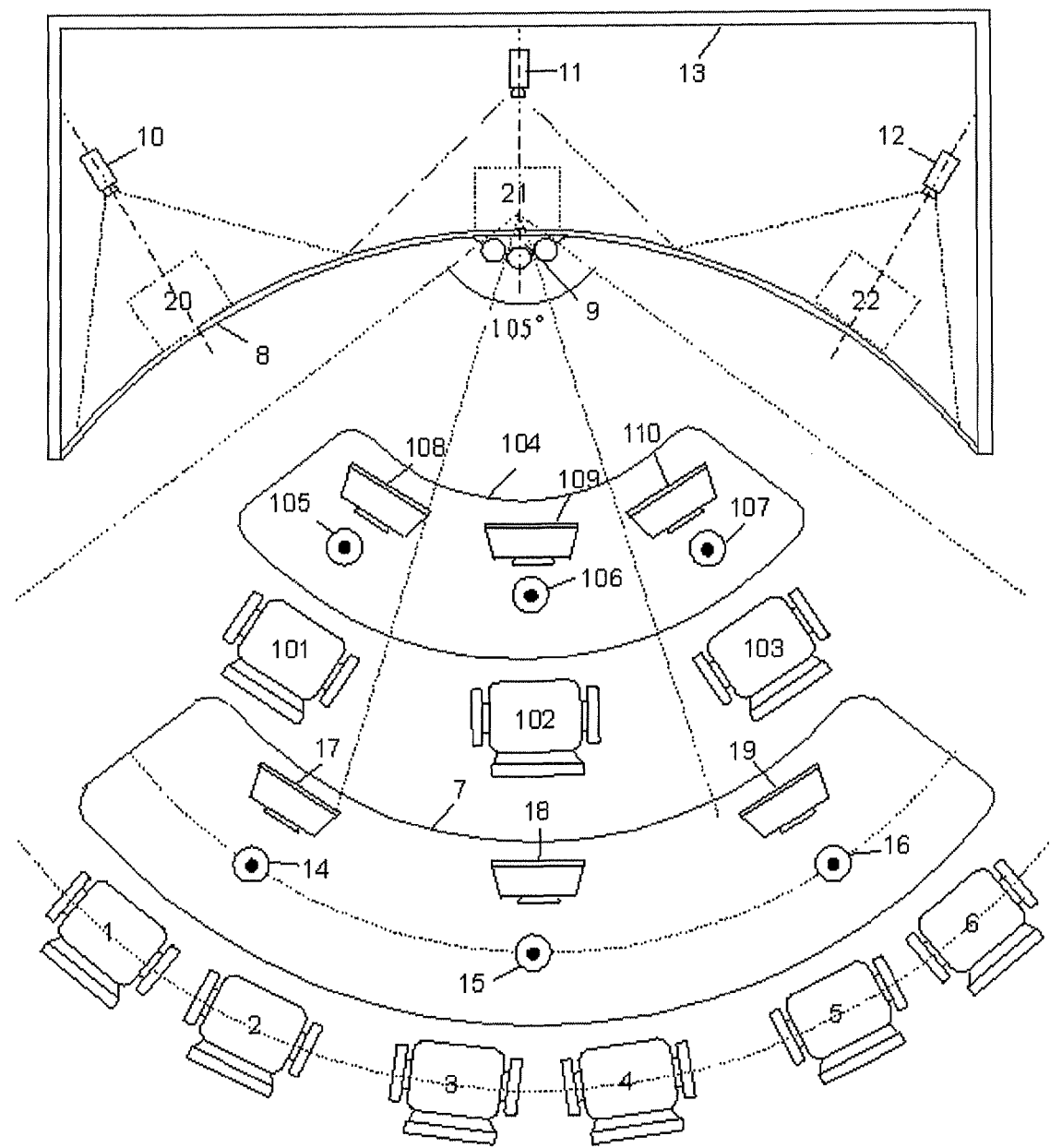
FIG. 3 is a second top diagram of a layout of a video communication system provided by an embodiment of the present invention.

FIG. 3 is another top diagram of an overall layout of a video conference system according to the present invention. Different from that in FIG. 2, the conference room layout scheme employs multiple rows of user seats (two rows of user seats are shown in FIG. 3). One or more rows of conference tables and corresponding seats may be added in front of or behind the existing conference table 7 of FIG. 2. For example, in FIG. 3, a conference table 104 is added, and seats 101 to 103 are added. The seats of the rear conference table 7 are farther away from the display, and the front row of conference participants incurs blocking, so that the experience is deteriorated. In order to solve the problem, the conference table and the seats of the rear row may be raised to a height as a whole, so as to form a tiered conference room layout, and when the seats are being designed, make the conference participant of the rear row be located between two conference participants of the front row. In this way, the conference participant of the rear row is not blocked by the front row, thereby improving user experience.

Figure 4:
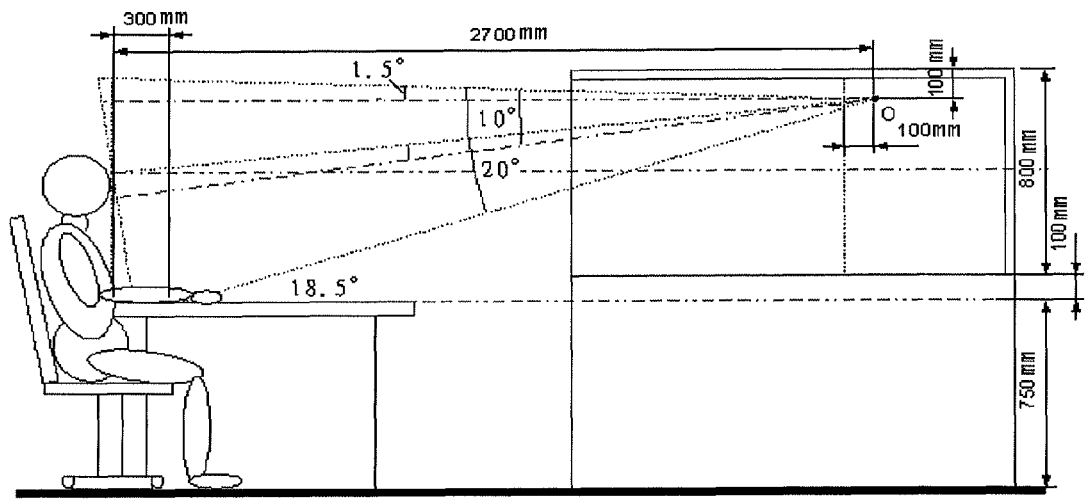
FIG. 4 is a side diagram of a layout of a video communication system provided by an embodiment of the present invention.

FIG. 4 is a side diagram of an overall layout of a video conference system according to the present invention (a side of a user is taken as an example). An optical center O of the video camera is behind the screen and 100 millimeters away from the screen, and is 100 millimeters away from a lower portion of an upper edge of an effective screen. A vertical shooting angle of the video camera is about 20°. The video camera cannot be placed on a horizontal line of sight of the user, so that the optical axis of the video camera needs to be inclined downwards by a preset angle. In the embodiment of the present invention, the angle is 8.5°. In order to make the table surface visible, during design, an arc band of 300 millimeters on the table edge is displayed to be 100 millimeters high on the arc screen, and in this way, a height range in which a portrait may be presented is about 800 millimeters. Human eyes are in the middle, and a vertical eye to eye deviation angle of 6.2° may be calculated, which is close to the eye contact angle deviation perceivable threshold of 5°, thereby achieving an excellent eye to eye effect.

Figure 5:
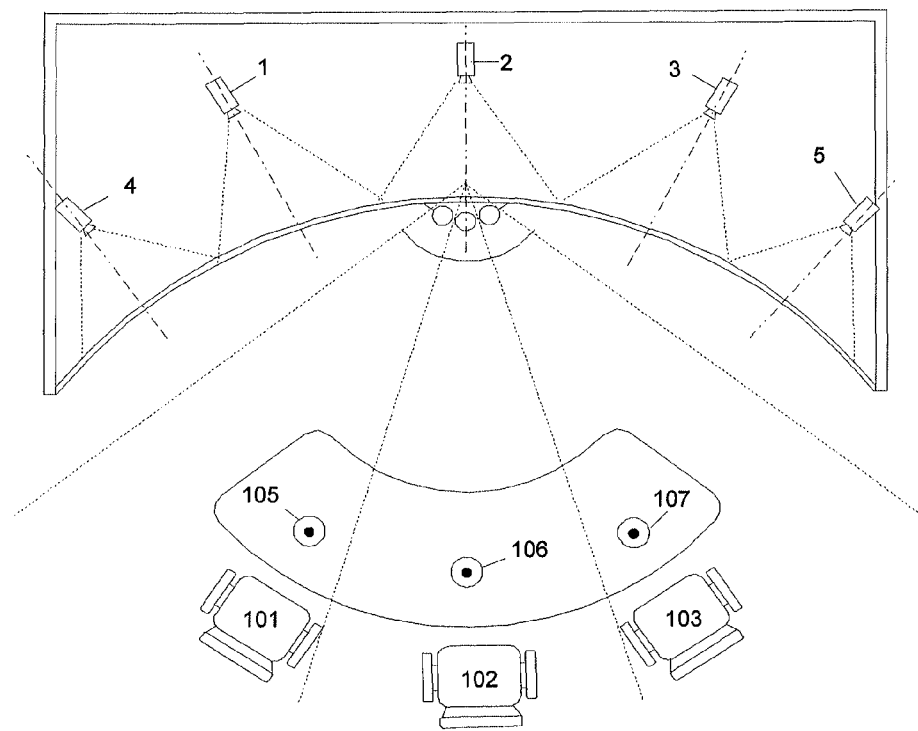
FIG. 5 is a third top diagram of a layout of a video communication system provided by an embodiment of the present invention.

Optionally, in the embodiment, the arc screen can not only display video data and display shared data information, but also be set flexibly according to a viewing position of the user. For example, a space may be spared from a display area of the arc screen to display the shared data information. The shared data information may include: shared words, pictures and video information. A source of the shared data information may be pre-stored locally, and may also be provided by the remote end through network transmission. Definitely, the shared data information may also be displayed by at least one additionally disposed display device. The at least one display device may be arranged at one end of the conference room, and may also be arranged at the extension of at least one display device for displaying a remote end conference site. As shown in FIG. 5, the arc screen may be extended, so as to add another display apparatus to display the shared data information. For example, two projection display areas 4 and 5 may be added. The original projection areas 1, 2 and 3 may also be set to display the shared data information. When a user sits at the position 102 to view the projection area 2, the projection area 2 may display a remote end conference site image and may also display the shared data information. When a user sits at the position 102 to view the projection areas 2 and 4, 2 may be set to display the remote end conference site image and 4 may be set to display the shared data information. When a user sits at the position 102 to view the projection areas 2, 4 and 5, 4 and 5 may be set to display the remote end conference site image and 2 may be set to display the shared data information. In this way, both parties participating in the conference can obtain the experience of viewing the shared data information together.

Figure 6:
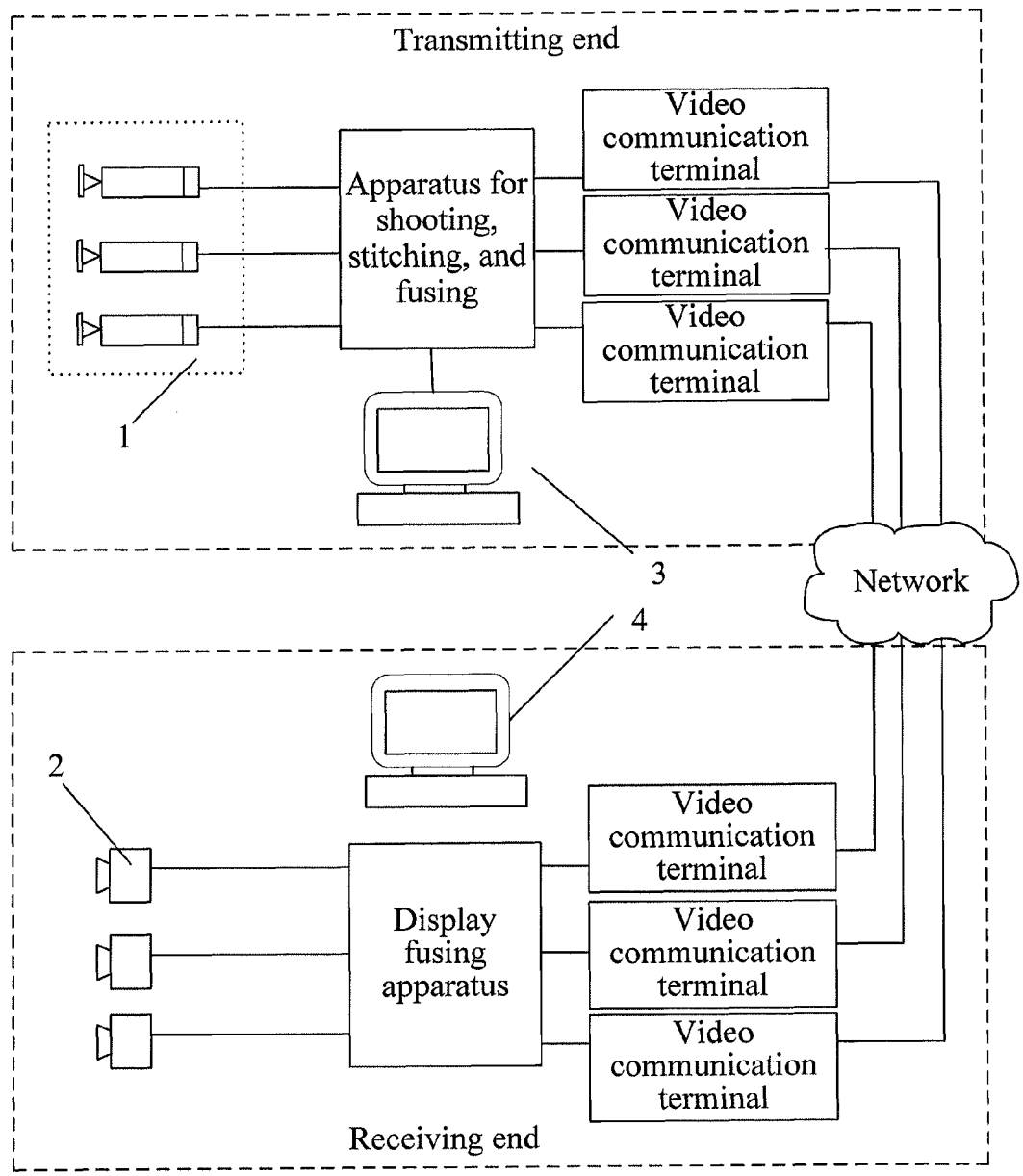
FIG. 6 is an apparatus connection diagram of a video communication system provided by an embodiment of the present invention.

FIG. 6 is an apparatus connection diagram of two video communication sites provided by an embodiment of the present invention. A co-optical-center video camera 1 at a transmitting end collects a conference site video image, outputs three channels of video images (generally, 1,920×1,080 high definition video images are employed) to an apparatus for shooting, stitching, and fusing at the transmitting end. The three original video images collected by the co-optical-center video camera 1 cannot be simply combined into an ideal conference site panoramic image, so that the apparatus for shooting, stitching, and fusing is required to process the three channels of video images, fuse the three channels of video images according to the fusion parameter among the first video processing parameters, and generate a high definition conference site panoramic video image being about 48:9. The panoramic video image may be output to three video communication terminals at the transmitting end through a three-channel manner. The video communication terminals code each video image, encapsulate an encoded video code stream into data packets, and transmit the data packets to a remote end video communication site through a network.

In the embodiment of the present invention, a concrete manifestation of an employed network is apparatuses in the network, which include hardware and any suitable control logic, and are used to interconnect elements coupled to the network and aid communications between sites shown by the embodiment. The network may include a local area network (LAN), a metropolitan area network (MAN), a wide area network (WAN), any other public or private network, a local, regional or global communication network, an intranet, other applicable wired or wireless communication link, and any combination thereof. The network may include a gateway, a router, a hub, a switch, an access point, a base station, any other hardware and software, and any combination thereof capable of implementing any suitable protocol or communication.

A receiving end receives data packets in the network, and uses video decoding units in the three video communication terminals to decode the three channels of video code streams to obtain three channels of video data, and outputs the three channels of video data to a display fusing apparatus. The display fusing apparatus fuses the three channels of video data according to the fusion parameter among the second video processing parameters, and finally outputs the fused data to three projectors 2, which is projected on an arc screen to form a high resolution panoramic seamless video image being about 48:9. 3 and 4 are two PC workstations, which are used as adjustment correction tools and are respectively configured to perform fusion processing together with the apparatus for shooting, stitching, and fusing and the display fusing apparatus before image display.

It should be noted that, the video encoder may be integrated in the apparatus for shooting, stitching, and fusing. Alternatively, when the system includes a transmitting end video communication terminal, the video encoder may be integrated in the transmitting end video communication terminal. The video decode may be integrated in the display fusing apparatus. Alternatively, when the system further includes a receiving end video communication terminal, the video decoder may be integrated in the receiving end video communication terminal.

In the embodiment of the present invention, the apparatus for shooting, stitching, and fusing is placed at the transmitting end, and the display fusing apparatus is placed at the receiving end. In fact, the display fusing apparatus may be placed at the transmitting end, connected to the apparatus for shooting, stitching, and fusing, and placed behind the apparatus for shooting, stitching, and fusing. The parameter required by the display fusing apparatus to process the video image may be obtained from the receiving end. The apparatus for shooting, stitching, and fusing may also be placed at the receiving end, connected to the display fusing apparatus, and placed before the display fusing apparatus. The parameter required by the apparatus for shooting, stitching, and fusing to process the video image may be obtained from the transmitting end.

In the video communication system provided by the embodiment of the present invention, the obtained at least two channels of video images are fused into a panoramic video image at the transmitting end of the video communication, and the fused panoramic video image can reflect a junction area position relationship between adjacent video images more realistically, so that the finally displayed image provides the user with more real panoramic experience, thereby solving the problem that adjacent video images shot by the video cameras have an overlapping or missing area at the junction thereof and are not consistent in brightness and color. At the video communication transmitting end in the embodiment of the present invention, after the panoramic video image is encoded into the video code stream to be transmitted to the video communication receiving end, the video communication receiving end performs further fusion processing on the video code stream, and outputs the video image after the fusion processing to the display apparatuses for display. The fusion processing performed by the video communication receiving end may enable multiple projected images to be presented on a screen seamlessly and differences between projection areas to be small in color and brightness, thereby improving visual continuity of the panoramic video image and providing the user with better immersive panoramic experience.

Working states of different apparatuses may be different, so that even in the same working environment, as a result, output results may be different due to different properties of components thereof. In order to solve the problem in the prior art that when multiple video cameras are used to shoot multiple images the images are different from one another in brightness and color and an image display effect is not ideal at the junction of images, embodiments of the present invention provide a video communication method and device.

Figure 7:
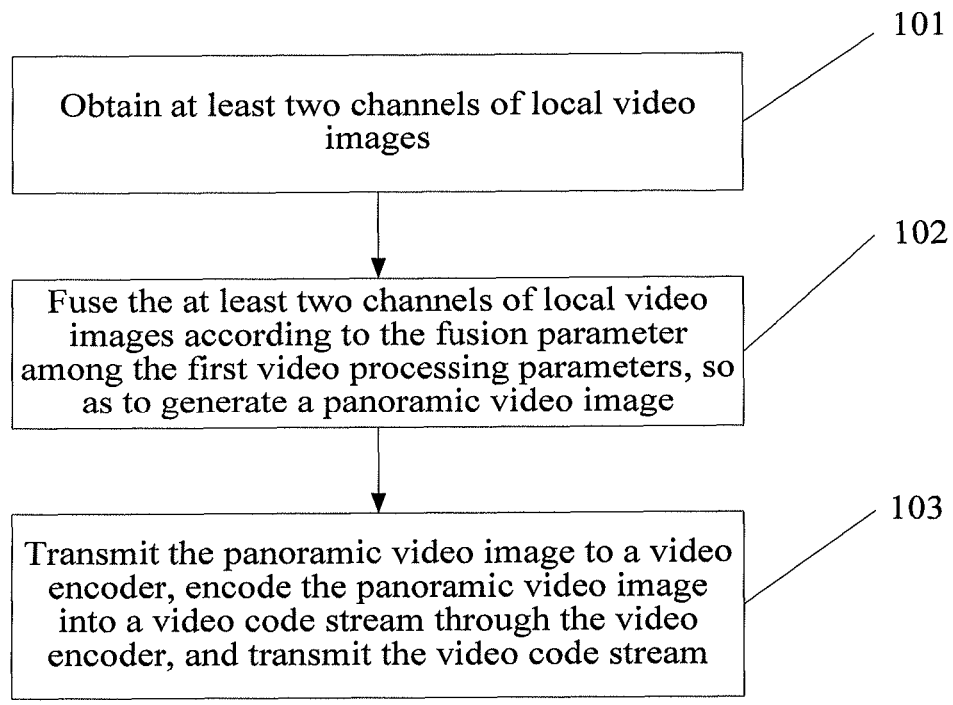
FIG. 7 is a flow chart of a video communication method provided by an embodiment of the present invention.

As shown in FIG. 7, a video communication method provided by an embodiment of the present invention includes:

Step 101: Obtain at least two channels of local video images.

In the embodiment, the obtained at least two channels of local video images are shot by a co-optical-center video camera. Specifically, through a PC device, a user first logs in an apparatus for shooting, stitching, and fusing, and sends, through the PC device, an image collection command to the apparatus for shooting, stitching, and fusing. After receiving the image collection command, the apparatus for shooting, stitching, and fusing obtains, from the co-optical-center video camera, the at least two channels of video images shot by the video camera, and saves the at least two channels of video images in a buffer of the apparatus for shooting, stitching, and fusing. Definitely, the apparatus for shooting the at least two channels of video images is not limited to the co-optical-center video camera, which is not listed herein one by one.

Step 102: Fuse the at least two channels of local video images according to the fusion parameter among the first video processing parameters, so as to generate a panoramic video image.

In the embodiment, the fusion parameter is a part of the first video processing parameters. The first video processing parameters are based on obtained video images. Specifically, the at least two channels of video images obtained in step 101 are transmitted to the PC device, and the PC device calculates the required fusion parameter according to the video images. The PC device transmits the calculated fusion parameter to the apparatus for shooting, stitching, and fusing. The apparatus for shooting, stitching, and fusing sets the received fusion parameter to a parameter that needs to be used in a working state, and splices the at least two channels of video images into a panoramic video image according to the set fusion parameter. It should be understood that, besides the implementation method, the fusion parameter may be calculated in the apparatus for shooting, stitching, and fusing, and the apparatus for shooting, stitching, and fusing directly performs the whole process of calculation, setting, and fusion without interacting with the PC device. In this way, the apparatus for shooting, stitching, and fusing needs to be able to obtain corresponding parameters of each local video camera, so as to determine the fusion parameter and relevant parameters for performing GAMMA correction, sensor dead pixel compensation, image processing related transformation, trimming, scaling, and segmentation. Alternatively, one or more PC devices perform the process of calculation, setting, and fusion, without interacting with the apparatus for shooting, stitching, and fusing. The implementation manner of an actual product is determined by specific demands of a user, which is not described herein.

Step 103: Transmit the panoramic video image to a video encoder, encode the panoramic video image into a video code stream through the video encoder, and transmit the video code stream.

The video encoder may be integrated in a transmitting end video communication terminal, and may also be integrated in the apparatus for shooting, stitching, and fusing. In the embodiment, the transmitting end video communication terminal encodes the fused panoramic video image, and transmits the encoded video code stream to a network. The video communication receiving end receives the video code stream from the network.

In a point to point (Point To Point) video communication structure, the encoded video code stream is transmitted to the receiving end through the network. However, in a point to multi-point (Point To Multi-Point) video communication structure, the encoded video code stream may be transmitted to a corresponding multi-point communication server, and the multi-point communication server transmits the encoded video cod stream to a corresponding receiving end after performing multi-point fusion processing.

In the video communication system provided by the embodiment of the present invention, the obtained at least two channels of video images are fused into a panoramic video image, and the fused panoramic video image can reflect a junction area position relationship between adjacent video images more realistically, so that the finally displayed image provides the user with more real panoramic experience, thereby solving the problem that adjacent video images shot by the video cameras have overlapping and missing areas at the junction thereof and are not consistent in brightness and color.

Figure 8:
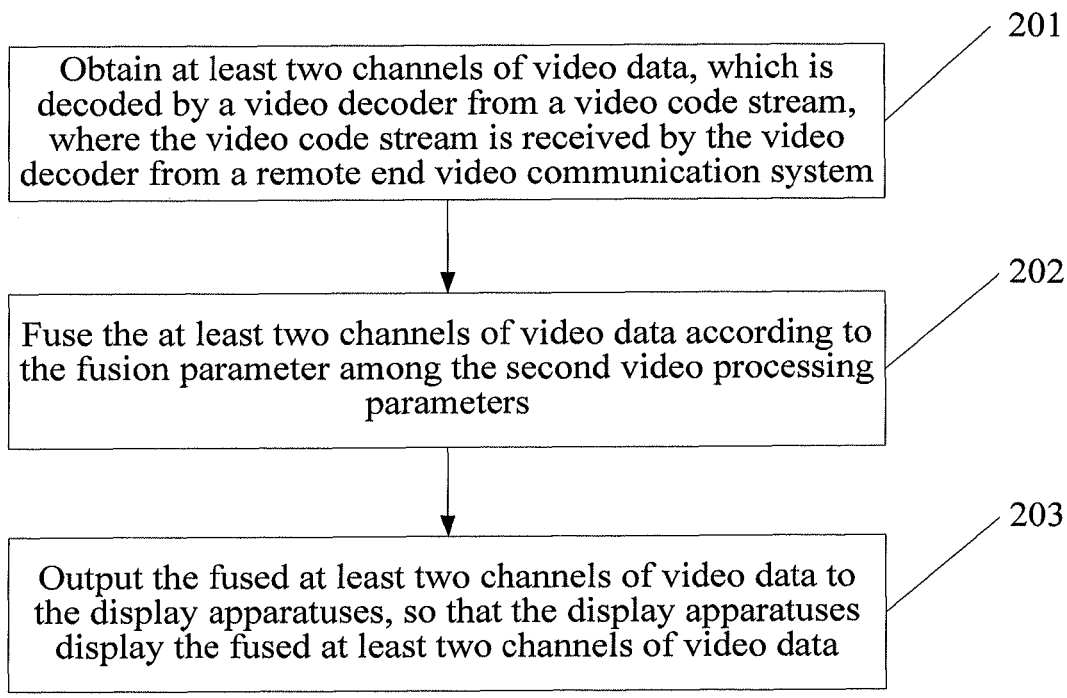
FIG. 8 is a flow chart of a video communication method provided by another embodiment of the present invention.

As shown in FIG. 8, another embodiment of the present invention further provides a video communication method, which includes:

Step 201: Obtain at least two channels of video data, which is decoded by a video decoder from a video code stream, where the video code stream is received by the video decoder from a remote end video communication site.

In the embodiment, a transmitting end segments the video code stream into at least two channels of video code streams for transmission, so as to increase processing speed and decrease an error rate. At a receiving end, the video decoder receives the at least two channels of video code streams from the network, and obtain the at least two channels of video data by decoding the video code streams. The video decoder may be integrated in a receiving end video communication terminal, and may also be integrated in a display fusing apparatus.

Step 202: Fuse the at least two channels of video data according to the fusion parameter among the second video processing parameters.

In the embodiment, due to differences between display apparatuses, differences in color and brightness between the at least two channels of video data exist, and therefore is fused to eliminate the differences. Similar to the operation of image fusion at the transmitting end, a PC device first calculates the fusion parameter, and transmits the fusion parameter to the display fusing apparatus. The display fusing apparatus sets the received fusion parameter to a fusion parameter used in a working state, and fuses the at least two channels of video data according to the set fusion parameter. It should be understood that, in the embodiment of the present invention, the process of calculating the second video processing parameters may also be performed in the display fusing apparatus. That is, the display fusing apparatus directly performs the whole process of calculation, setting, and fusion without interacting with the PC device. In this way, the apparatus for shooting, stitching, and fusing needs to be able to obtain corresponding parameters of each local video camera, so as to determine the fusion parameter and relevant parameters for performing GAMMA correction, sensor dead pixel compensation, image processing related transformation, trimming, scaling and segmentation. Alternatively, one or more PC devices perform the process of calculation, setting, and fusion alone, without interacting with the display fusing apparatus. An actual implementation manner may be determined according to specific demands of a user, which is not described herein.

Step 203: Output the fused at least two channels of video data to the display apparatuses, so that the display apparatuses display the fused at least two channels of video data.

In the embodiment of the present invention, the display apparatuses include projectors and screens, or displays. The screen is not limited to an arc screen, and may also be an oval screen, or a parabolic screen, or a polygon face screen, or a straight screen, and the display is generally a high definition flat panel display, so as to obtain a high definition video image. Further, when the display apparatuses are projectors and an arc screen, or projectors and an oval screen, or projectors and a parabolic screen, before the at least two channels of video data is fused, projection correction needs to be performed on the at least two channels of video data according to the projection correction parameter, so as to eliminate influence of transformation of the screen shape on an image display effect.

In the video communication method provided by the embodiment of the present invention, after the fused panoramic video image is encoded into the video code stream to be transmitted to the video communication receiving end, the video communication receiving end performs further fusion processing on the video code stream, and outputs the video image after the fusion processing to the display apparatuses for display. The fusion processing performed by the video communication receiving end may enable multiple projected images to be presented on a screen seamlessly and differences between projection areas to be small in color and brightness, thereby improving visual continuity of the panoramic video image and providing the user with better immersive panoramic experience.

To enable persons skilled in the art to understand the technical solutions according to the embodiments of the present invention more clearly, the video communication method provided by embodiments of the present invention is illustrated below in detail through specific embodiments.

Figure 9:
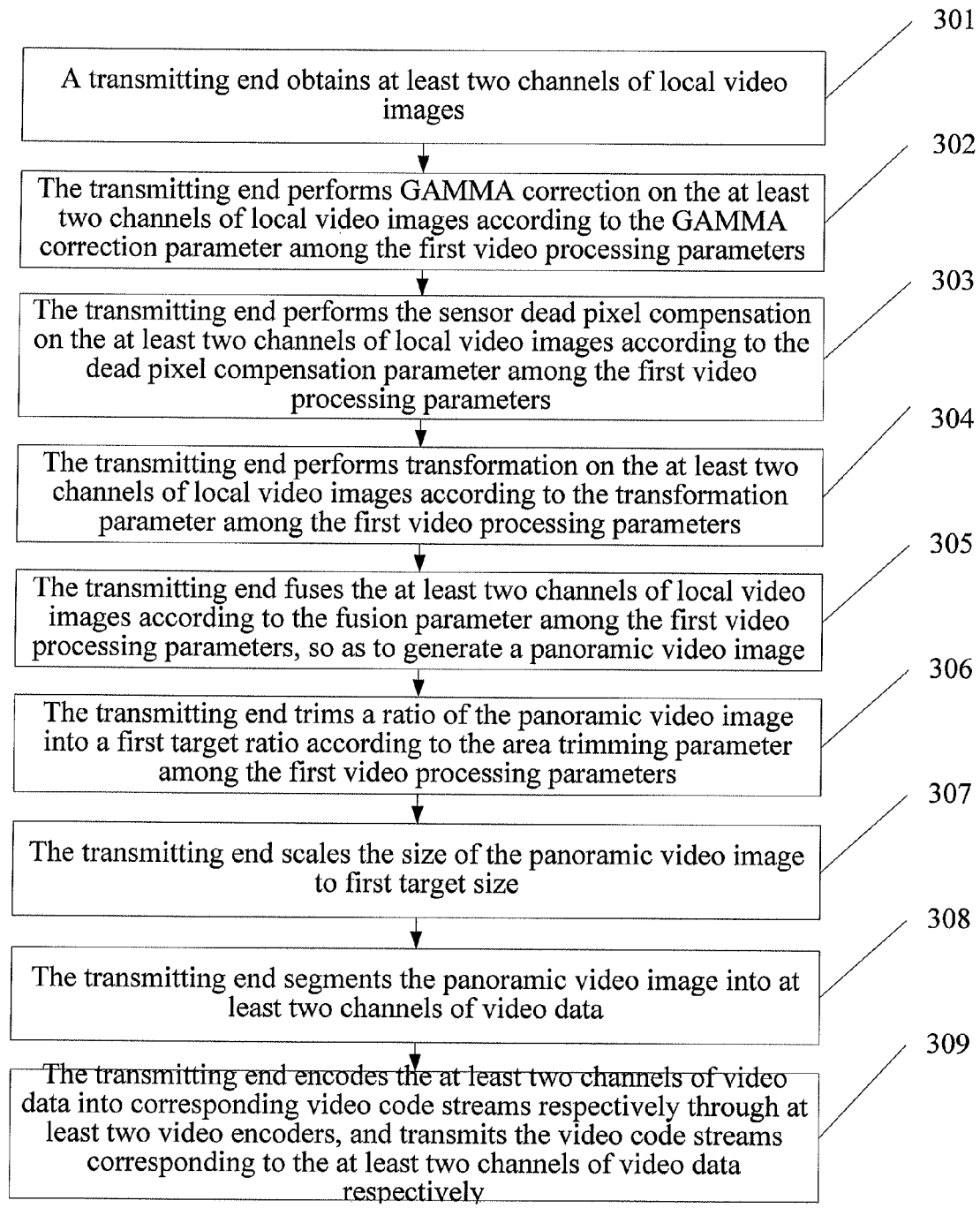
FIG. 9 is a flow chart of a method at a video communication transmitting end provided by another embodiment of the present invention.
Figure 10:
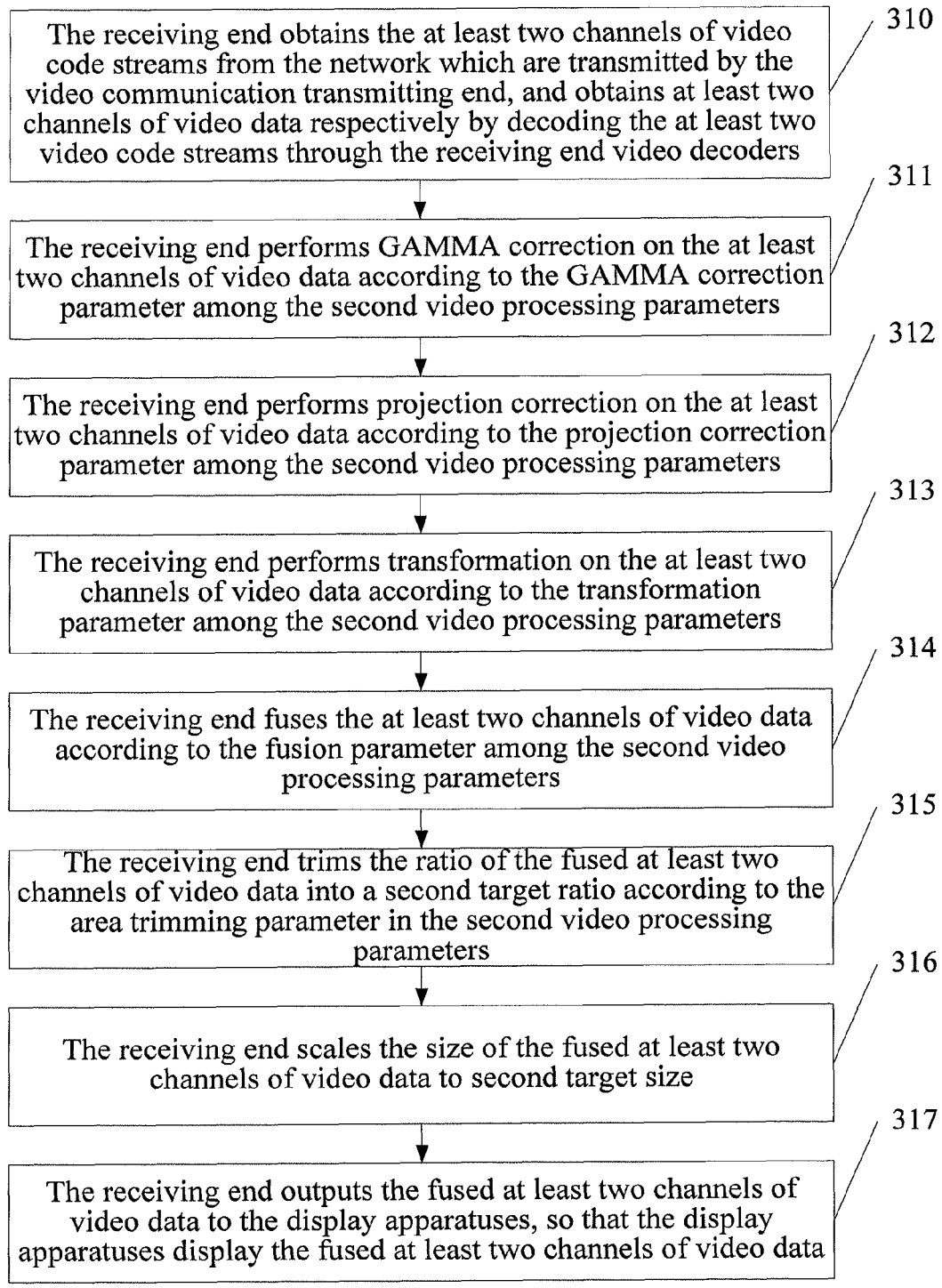
FIG. 10 is a flow chart of a method at a video communication receiving end provided by another embodiment of the present invention.

As shown in FIG. 9 and FIG. 10, another embodiment of the present invention provides a video communication method.

The flow of the method at a video communication transmitting end is described below in detail, which, as shown in FIG. 9, includes the following steps:

Step 301: A transmitting end obtains at least two channels of local video images.

In the embodiment, the obtained at least two channels of local video images are shot by a co-optical-center video camera. Video image collection at the transmitting end is: after an apparatus for shooting, stitching, and fusing is logged in through a PC device, an image collection command is sent to the apparatus for shooting, stitching, and fusing, and the apparatus for shooting, stitching, and fusing uses the co-optical-center video camera to shoot at least two channels of video images. In the embodiment, the co-optical-center video camera has three chassis, and collects three channels of video conference scenes. The resolution of each video image is 16:9 or 4:3. As shown by the embodiment of FIG. 2, each video image is shot by one of video cameras of the co-optical-center video camera. In FIG. 2, the co-optical-center video camera includes three video cameras, which are a left video camera, a middle video camera and a right video camera. The left video camera shoots conference participants with serial numbers of user seats being 1 and 2. The middle video camera shoots conference participants with serial numbers of user seats being 3 and 4. The right video camera shoots conference participants with serial numbers of user seats being 5 and 6. The co-optical-center video camera can shoot all of the conference participants, and shooting time of the three video cameras is synchronized.

Step 302: The transmitting end performs GAMMA correction on the at least two channels of local video images according to the GAMMA correction parameter among the first video processing parameters.

In the embodiment, before processing the obtained images, the apparatus for shooting, stitching, and fusing is required to check whether video processing parameters required for processing the images are already set. In the embodiment, the video processing parameters refer to the first video processing parameters. If the parameters are not set, the received video images undergo transparent transmission. That is, the video images are not processed, and are output directly. If the parameters are already set, the image processing is performed. In the case in which the parameters are already set, which parameters that are set further need to be judged. For example, if only the GAMMA parameter is set, and the sensor dead pixel compensation parameter is not set, only the GAMMA correction operation is performed. The apparatus for shooting, stitching, and fusing may receive the video images processed by the chassis of the co-optical-center video camera, and may also receive video images sent out by a co-optical-center video camera sensor that are not processed, such as a charge coupled device (Charge Coupled Device, CCD) or a complementary metal oxide semiconductor (Complementary Metal Oxide Semiconductor, CMOS). When the apparatus for shooting, stitching, and fusing receives the video images that are not processed, GAMMA correction and sensor dead pixel compensation processing need to be performed on the video images.

Step 303: The transmitting end performs the sensor dead pixel compensation on the at least two channels of local video images according to the dead pixel compensation parameter among the first video processing parameters.

In the embodiment, if a sensor outputting a video image has a dead pixel, the video image also has a dead pixel. In the dead pixel compensation processing, a pixel value at the dead pixel may be obtained according to differences of values of pixels adjacent to the dead pixel on the video image. Pixel interpolation is in the prior art of image processing, and multiple channels may be included, which are not described herein.

Step 304: The transmitting end performs transformation on the at least two channels of local video images according to the transformation parameter among the first video processing parameters.

In the embodiment, the transformation includes any one or combination of: video image translation, video image rotation, video image homographic transformation, and video image cylindrical transformation.

In the embodiment, according to principles of projective geometry, a three-dimensional point in the space is projected on an imaging plane of the co-optical-center video camera. A coordinate transformation relationship between the three-dimensional point and a planar point is:

$$\bar{x} = K[R|t]X \qquad \text{formula (1)}$$

$$K = \begin{bmatrix} f_x & s & u_0 \\ 0 & f_y & v_0 \\ 0 & 0 & 1 \end{bmatrix} \qquad \text{formula (2)}$$

where $\bar{x}$ is homogeneous representation of a planar coordinate, X is homogeneous representation of the world coordinate system, $f_x$ and $f_y$ are equivalent focal lengths in a horizontal direction and a vertical direction, s is an image distortion coefficient, $u_0$, $v_0$ are image main point coordinates; R is a rotation matrix of the video camera, t is a video camera translation vector; K is called an internal parameter of the video camera, and includes equivalent focal lengths in the horizontal and vertical directions, the image distortion coefficient, and the image main point coordinates; R and t are called video camera external parameters.

After the three-dimensional point is converted into the planar point, the following three methods may be used to perform video image transformation.

In a first method, for three video images, which are shot by the three video camera chassis of the co-optical-center video camera and have an overlapping area, an imaging relationship of a point on a plane in the space on two of the video images is:

$$x' = Hx = \begin{bmatrix} h_{11} & h_{12} & h_{13} \\ h_{21} & h_{22} & h_{23} \\ h_{31} & h_{32} & h_{33} \end{bmatrix} x \qquad \text{formula (3)}$$

where H is a 3×3 matrix whose freedom degree is 8, represents a transformation relationship between two imaging planes, and is called a homographic matrix; x is homogeneous representation of an image coordinate before transformation, and x' is homogeneous representation of the image coordinate after the transformation.

For the co-optical-center video camera, the parameter t is not taken into account, so that H may be represented by:

$$H \approx K'R'R^{-1}K^{-1} \qquad \text{formula (4)}.$$

It is assumed that coordinates (x, y) and (x', y') of a point pair on an image before the transformation and an image after the transformation are known, two equations may be obtained:

$$x' = \frac{h_{11}x + h_{12}y + h_{13}}{h_{31}x + h_{32}y + h_{33}} \quad y' = \frac{h_{21}x + h_{22}y + h_{23}}{h_{31}x + h_{32}y + h_{33}}. \qquad \text{formula (5)}$$

The freedom degree of H is 8, so that the homographic matrix H may be obtained by using only 4 point pairs at least to establish 8 equations. After the homographic matrix H is obtained, two images may be spliced together through a coordinate transformation, and pixels in the overlapping area are aligned. Multiple methods for calculating H are available. One is a manual method, in which a user selects coordinates of 4 points on the image before transformation and coordinates of the 4 points on the image after the transformation. According to the coordinates of the four point pairs, the formula (5) may be used to establish equations including at least 8 equations, so as to obtain the homographic matrix H. Another method is an automatic method, and the method requires that there is a large overlapping area between the two images. A feature point extraction algorithm, for example, a scale-invariant feature transform algorithm (Scale-invariant feature transform, SIFT), may be used to perform feature point extraction on the overlapping area to find multiple feature points, a matching relationship between the feature points is established, the formula (5) is used to establish equations including at least 8 equations, and the homographic matrix H between the two images is obtained through an iterative optimization algorithm.

In a second method, the obtaining the homographic matrix H in the first method is complex, so that in a case in which the image changes slightly, affine transformation may be employed to simulate homographic transformation. The following transformation formula may be employed:

$$x' = S[R|T]x \qquad \text{formula (6)}$$

$$S = \begin{bmatrix} s_x & 0 \\ 0 & s_y \end{bmatrix}$$

$$R = \begin{bmatrix} \cos\theta & -\sin\theta \\ \sin\theta & \cos\theta \end{bmatrix}$$

$$T = \begin{bmatrix} t_x \\ t_y \end{bmatrix}$$

where S is an image scaling matrix, R is a two-dimensional rotation matrix, and T is a translation vector; x is homogeneous representation of an image coordinate before transformation, and x' homogeneous representation of the image coordinate after the transformation.

In a third method, cylindrical coordinate transformation is employed to convert planar coordinates into cylindrical coordinates, and under the cylindrical coordinates, images are spliced through image translation. Transformation and inverse transformation of cylindrical coordinates are:

$$x' = s\tan^{-1}\frac{x}{f} \quad y' = s\frac{y}{\sqrt{x^2 + f^2}} \quad \text{formula (7)}$$

and $$x = f\tan\frac{x'}{s} \quad y = f\frac{y'}{s}\sec\frac{x'}{s}. \quad \text{formula (8)}$$

It should be noted that, steps 302, 303 and 304 are implementation steps in the prior art, and changing of the sequence of the three steps does not affect the effect achieved by the present invention.

Step 305: The transmitting end fuses the at least two channels of local video images according to the fusion parameter among the first video processing parameters, so as to generate a panoramic video image.

In the embodiment, after the image transformation in step 304, generally an ideal seamless image cannot be obtained either, and differences between the video images shot by the chassis of the co-optical-center video camera in brightness and chroma, which are caused by exposure or color differences between the video images, have to be further taken into account. The differences are especially obvious at the joint of the two video images, so that the multiple images need to be fused to eliminate the differences between the different images in brightness or chroma. In the embodiment, Alpha fusion may be performed on the overlapping area at the joint of the video images. A formula of the Alpha fusion is:

$$I(x, y) = \alpha_1(x, y)I_1(x, y) + \alpha_2(x, y)I_2(x, y) \quad \text{formula (9).}$$

$\alpha_1(x, y)$ is an Alpha value of a pixel (x, y) of a video image 1, $I_1(x, y)$ is a color value of the pixel (x, y) of the video image 1. $\alpha_2(x, y)$ and $I_2(x, y)$ are an Alpha value and a color value of the pixel (x,y) of a video image 2. For simple linear Alpha fusion, $\alpha_1(x, y) + \alpha_2(x, y) = 1$. The Alpha fusion generally is only applicable to fusion of differences in brightness or chroma at the joint of video images. If differences between the video images in brightness or chroma are large, an excellent result cannot be achieved by using the Alpha fusion, and in this case Laplacian pyramid fusion, or gradient threshold fusion, or Poisson fusion may be performed on the whole video images, specific fusion principles of which are not described herein.

Step 306: The transmitting end trims a ratio of the panoramic video image into a first target ratio according to the area trimming parameter among the first video processing parameters.

In the embodiment, the objective of the image trimming is to remove a part, which does not need to be displayed, of the image. The first target ratio is determined manually according to an actual situation.

In step 302 to step 306, the first video processing parameters need to be used. Before the video images are processed, the first video processing parameters need to be set first. The video images are processed according to the set parameters. A method for setting the first video processing parameters is described below in detail.

In the embodiment, the apparatus for shooting, stitching, and fusing and the PC device may be combined. The PC device is also called a first processing device. The PC device calculates the first video processing parameters. The apparatus for shooting, stitching, and fusing sets the first video processing parameters, and processes the images according to the parameters. Besides the implementation method, alternatively, the apparatus for shooting, stitching, and fusing collects at least two images, the apparatus for shooting, stitching, and fusing calculates the video processing parameters according to the collected images. That is, the apparatus for shooting, stitching, and fusing directly performs the process of calculation, setting, and image processing, without interacting with the PC device. For example, the user may manually control, through a remote control or a mouse, the apparatus for shooting, stitching, and fusing to generate the desired video processing parameters. Alternatively, an automatic algorithm may be employed to enable the apparatus for shooting, stitching, and fusing to generate the desired video processing parameters automatically. Alternatively, one or more PC devices perform the process of calculation, setting and image processing alone, without interacting with the apparatus for shooting, stitching, and fusing. For example, the user uses adjustment correction software on the PC device to automatically generate the desired video processing parameters, and performs image processing directly on the PC device according to the parameters. The calculation of the parameters is performed by a central processing unit (Central Processing Unit, CPU), and the image processing may be performed by the CPU or a graphic processing unit (Graphic Processing Unit, GPU). If a single PC device is not able to perform the image processing, multiple PC devices may be employed to perform networking-based distributed computing. The multiple PC devices are interconnected through the high-speed Ethernet. An actual implementation manner of the above methods may be determined according to specific demands of a user, which is not described in detail herein.

It should be noted that, the PC device described in the embodiment is only a specific implementation manner. In fact, a device, which has an audio/video input/output apparatus and a processor, can perform the image processing. With the development of cloud computing technologies, for the embodiment, a processor array may be disposed on a telepresence management server, and the server side performs corresponding image processing on the collected images.

Figure 15:
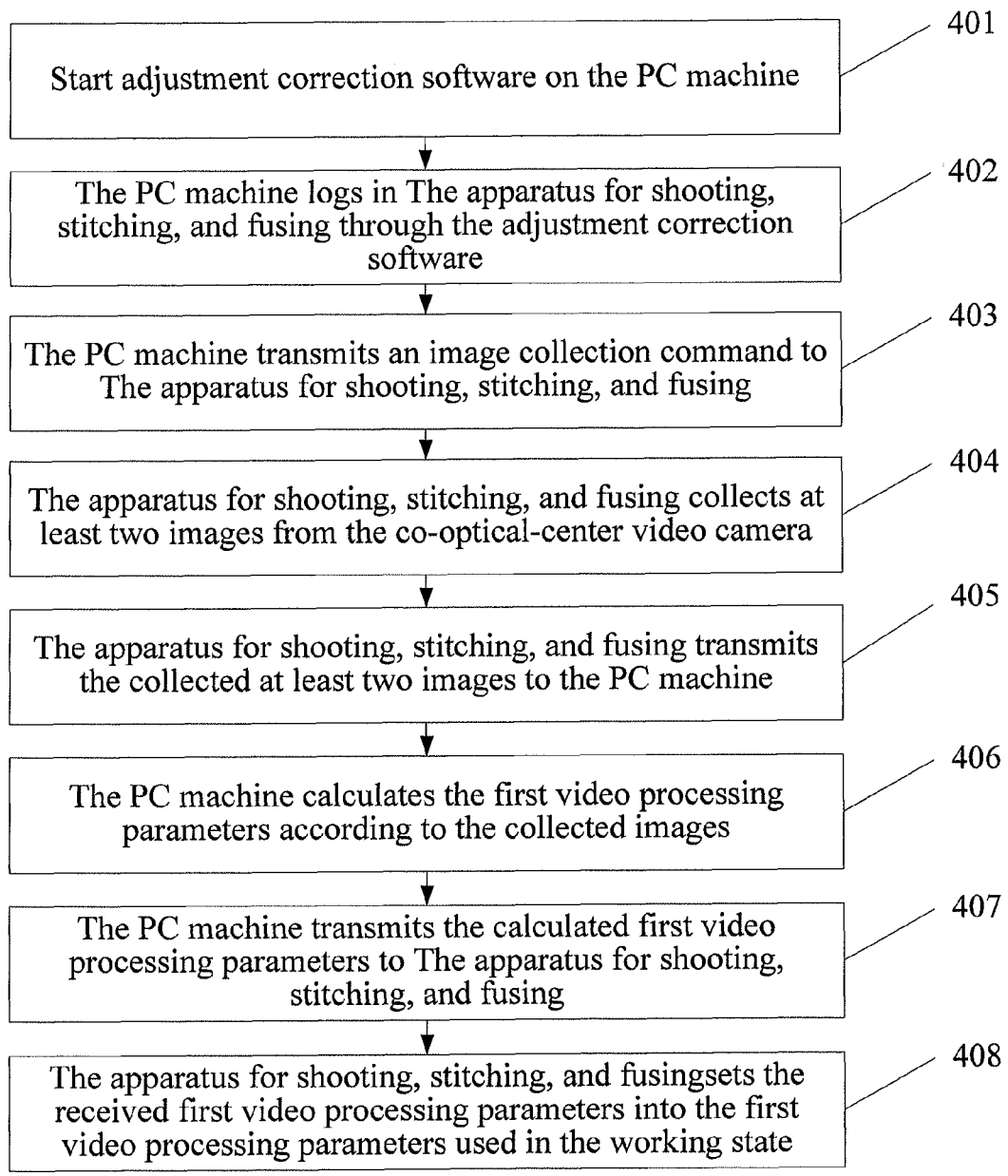
FIG. 15 is a flow chart of the setting of first video processing parameters at a transmitting end in a video communication method provided by an embodiment of the present invention.

When the apparatus for shooting, stitching, and fusing and the PC device (also called the first processing device) are used together to perform calculation and setting of the video processing parameters, the specific setting method may be implemented through steps shown in FIG. 15.

Step 401: Start adjustment correction software on the PC device.

Figure 16:
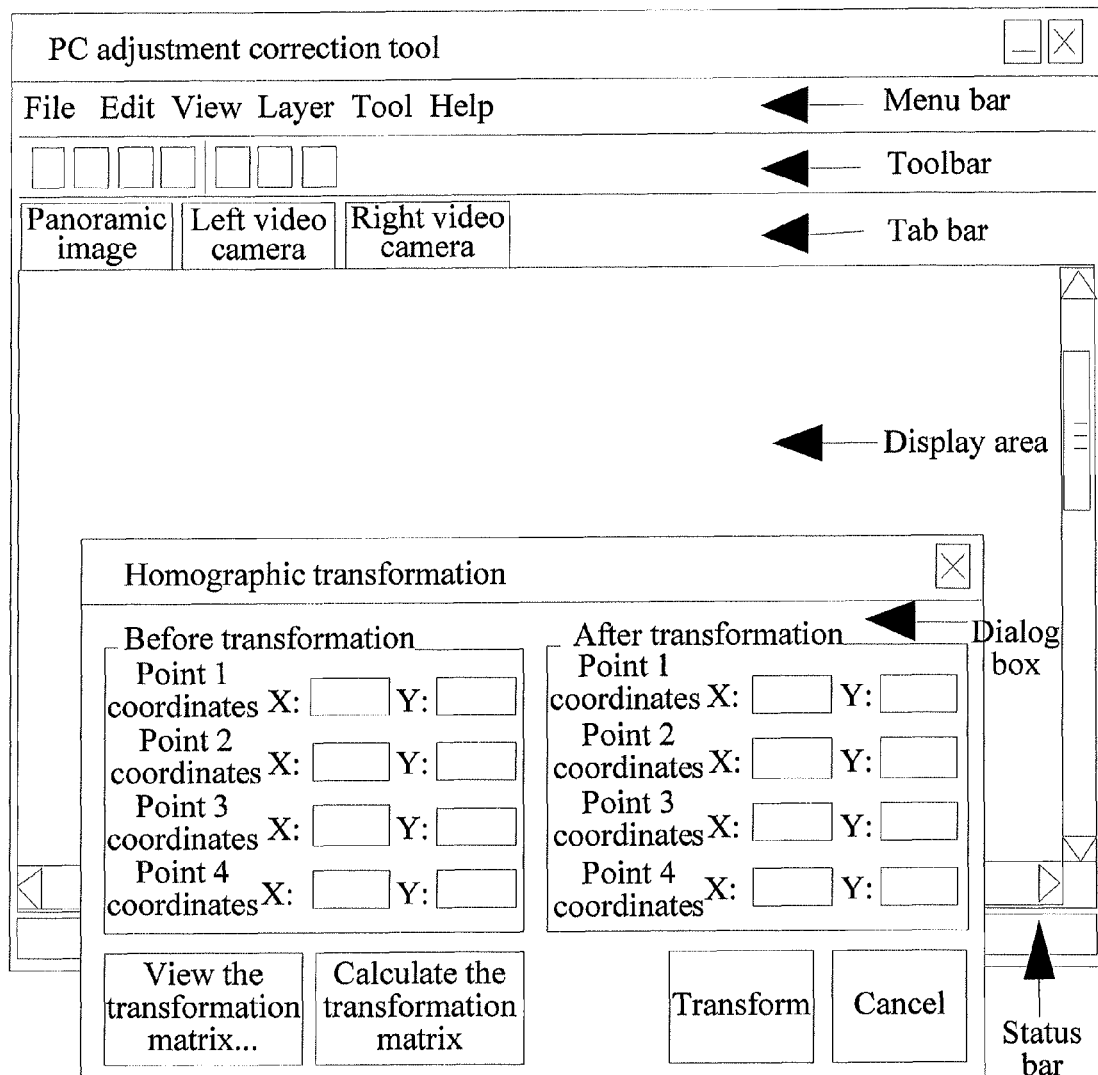
FIG. 16 is a schematic view of an interface of adjustment correction software on a PC device provided by an embodiment of the present invention.

In the embodiment, the adjustment correction software has a GUI interface. As shown in FIG. 16, the GUI interface includes a menu bar, a toolbar, a Tab bar, a display area, a status bar, and a dialog box. The menu bar is used for the user to select a relevant command, and support operation of a mouse and keyboard shortcut keys. The toolbar is used for the user to rapidly select a frequently used command. The Tab bar is used for listing opened images, and the user may switch between the opened images and close the opened image. The display area is used to display the current image operated by the user, and supports a scroll bar, so that the user may draw the scroll bar to view the image content incapable of being displayed in the current window. The user may use the mouse and the keyboard to perform interactive operation on the images to be spliced in the display area, for example, image adjustment and transformation and the fusion parameter, and viewing the effect in a real time manner. The status bar is used for displaying some currently important information, such as the size of the image and the current mouse coordinates. The dialog box is triggered by the menu bar or the toolbar, and is used for performing complex jobs and tasks requiring input by the user through the keyboard. After the user obtains a satisfactory image splicing and fusing effect, the image transformation parameter, and the Alpha fusion and GAMMA correction parameters required by the apparatus for shooting, stitching, and fusing and the display fusing apparatus may be generated and transmitted to the apparatus for shooting, stitching, and fusing and the display fusing apparatus through a simple command.

Step 402: The PC device logs in, through the adjustment correction software, the apparatus for shooting, stitching, and fusing.

The adjustment correction software may be used as third party software to be installed locally on the PC device, and may also be run by a WEB page which is embedded in the PC device and visits the server.

Step 403: The PC device transmits an image collection command to the apparatus for shooting, stitching, and fusing.

Step 404: The apparatus for shooting, stitching, and fusing obtains acquired at least two images from the co-optical-center video camera.

In the embodiment, after receiving the video image collection command, the apparatus for shooting, stitching, and fusing obtains 3 collected video images from the co-optical-center video camera, which are saved in the buffer of the apparatus for shooting, stitching, and fusing.

Step 405: The apparatus for shooting, stitching, and fusing transmits the collected at least two images to the PC device.

In the embodiment, the apparatus for shooting, stitching, and fusing transmits the 3 video images to the PC device through the data transfer protocol.

Step 406: The PC device calculates the first video processing parameters according to the collected images.

In the embodiment, the parameters calculated by the PC device include one or more of: a video camera GAMMA correction parameter, a video camera sensor dead pixel compensation parameter, an image transformation parameter, an image Alpha fusion parameter table and an image area trimming parameter.

Step 407: The PC device transmits the calculated first video processing parameters to the apparatus for shooting, stitching, and fusing.

In the embodiment, a data transfer interface between the PC device and the apparatus for shooting, stitching, and fusing may employ interfaces such as Ethernet and USB, and the transfer protocol may employ the file transfer protocol (File Transfer Protocol, FTP), the hypertext transfer protocol (Hypertext Transfer Protocol, HTTP), or employ the transmission control protocol (Transmission Control Protocol, TCP), the user datagram protocol (User Datagram Protocol, UDP), and the customized high-level transport protocol for transmission. When the data volume of the calculated parameters is huge, the data transfer protocol is used for the transmission to the apparatus for shooting, stitching, and fusing.

In the embodiment, functions of the PC device further include transmitting a setting command to the apparatus for shooting, stitching, and fusing. The setting command may be transmitted through multiple manners, for example, transmitted through a serial port, a parallel port or a network interface. If transmission is performed through the network interface, the teletype network (Telnet, Teletype network) may be employed, or the TCP protocol, the UDP protocol and the customized high-level transport protocol are used for transmission.

Step 408: The apparatus for shooting, stitching, and fusing sets the received first video processing parameters to the first video processing parameters used in the working state.

Step 307: The transmitting end scales the size of the panoramic video image to first target size.

In the embodiment, after the video image is trimmed in step 306, the size of the video image may become smaller, so that the video image is scaled to enable the size thereof to reach the size required by the user. The first target size is determined manually according to an actual situation.

Step 308: The transmitting end segments the panoramic video image into at least two channels of video data.

In the embodiment, the panoramic video image is segmented into three channels of video data output to three video communication terminals, so as to increase the data processing speed and decrease the error rate. Definitely, the panoramic video image may be directly encoded and transmitted without being segmented, but the display effect of the video image of this method is poor.

Step 309: The transmitting end encodes the at least two channels of video data into corresponding video code streams through at least two video encoders, and transmits the video code streams corresponding to the at least two channels of video data.

In the embodiment, video encoders in the three video communication terminals code the three channels of video data to obtain three channels of video code streams, and transmit the three channels of video code streams to the network, which are received by the receiving end from the network. The video encoder may be integrated in the video communication terminal, and may also be integrated in the apparatus for shooting, stitching, and fusing. In order to ensure end-to-end synchronization, the transmitting end and the receiving end are required to perform synchronized encoding and decoding. In order to avoid asynchronous encoding and decoding caused by factors such as network jitter, labeling needs to be performed on the video code stream. For example, a timestamp is put on a data packet of the video code stream, so as to ensure that the receiving end video decoder can perform the decoding according to a correct order.

In the embodiment, alternatively, a video communication terminal may be used to code and transmit the three channels of video data, and the advantage of the method is that synchronization of the three channels of video data is easy to achieve, and the structure of the whole video communication system may be optimized, but the method requires that the video communication terminal has greater encoding processing capacity.

The co-optical-center video camera is used in step 301 to shoot the video image. The principles and structure of the co-optical-center video camera are described below in detail.

Figure 11:
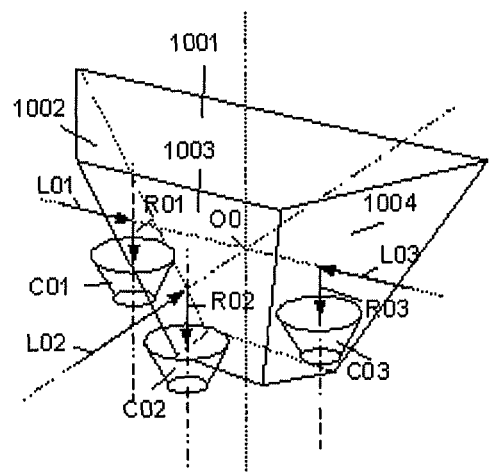
FIG. 11 is a first schematic diagram of a co-optical-center video camera provided by an embodiment of the present invention.
Figure 12:
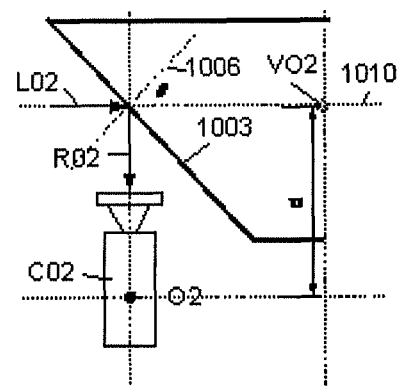
FIG. 12 is a second schematic diagram of a co-optical-center video camera provided by an embodiment of the present invention.

As shown in FIG. 11, 1001 is a frustum structure and has three surfaces 1002, 1003 and 1004. The surfaces are planar mirror surfaces. Three video cameras C01, C02 and C03 are placed below the mirror surfaces. The principles of the virtual co-optical center are illustrated by using the video camera C02 as an example. As shown in FIG. 12, L02 is incident light, R02 is reflected light, the normal perpendicular to the reflective surface 1003 is 1006. The normal 1006 and a horizontal line 1010 form an angle θ=45°. A vertical distance between a reflection point and a real optical center O2 of the video camera C02 is d. According to the light reflection principle, the video camera may shoot a virtual image, and the virtual image has a virtual optical center VO2. By designing the angle of the mirror surface and the placement of the video camera, so that the virtual optical centers of the video cameras C01, C02 and C03 may be at the same point, so as to obtain three images shot by the co-optical-center video camera. Splicing and fusion processing are performed on the three images, so as to obtain a spliced image seamless in any depth.

Figure 13:
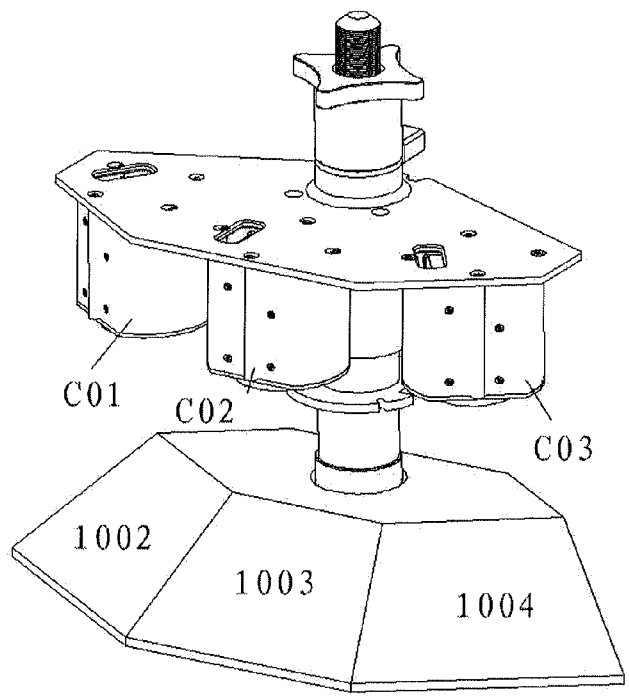
FIG. 13 is a schematic structural diagram of a co-optical-center video camera provided by an embodiment of the present invention.

FIG. 13 is a structural diagram of the co-optical-center video camera used by the embodiment of the present invention. C01, C02 and C03 are three high definition video camera chassis, and support high definition video output of 1,920×1,080. In order to achieve the better vertical eye to eye effect, the reflective mirror is placed in a lower position, and the video camera chassis are placed in an upper position for shooting. The surfaces 1002, 1003 and 1004 are reflective mirror surfaces. The three video camera chassis may be adjusted independently to compensate for the structure machining error and the error of the video camera chassis. The freedom of adjustment of the chassis includes translation and rotation in three directions of XYZ axes with the video camera chassis being the origin of coordinates. During shooting, the focal lengths of the video camera need to be adjusted to be the same, so as to ensure that the range of shooting angle of each video camera is the same.

Figure 14:
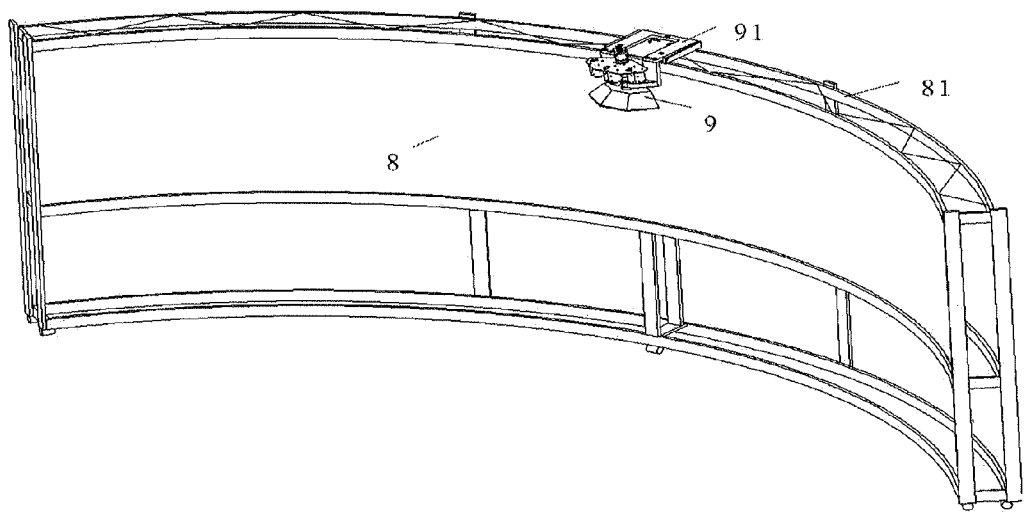
FIG. 14 is a mounting structure diagram of a co-optical-center video camera and an arc screen provided by an embodiment of the present invention.

FIG. 14 is an effect diagram showing that the co-optical-center video camera 9 according to the embodiment of the present invention is mounted on a rack 81 of an arc screen 8. In order to shoot a range of the table surface, the optical axis of the video camera has to be inclined downwards by an angle for shooting. The angle may be adjusted through a device 91 of the video camera, where the device 91 is mounted on the projection screen rack, and is 8.5 in the embodiment.

The flow of the method at a video communication receiving end is described below in detail, which, as shown in FIG. 10, includes the following steps.

Step 310: The receiving end obtains the at least two channels of video code streams from the network which are transmitted by the video communication transmitting end, and obtains at least two channels of video data by decoding the at least two channels of video code streams through the receiving end video decoders.

In the embodiment, the three video communication terminals at the receiving end obtain three channels of encoded video code streams from the network, which are decoded by the video decoders in the video communication terminals to obtain three channels of processed video data. The video decoder may be integrated in the receiving end video communication terminal, and may also be integrated in the display fusing apparatus.

It should be understood that, alternatively, a single video communication terminal at the receiving end may be used to decode the three channels of video code streams received from the network side, and multiple decoders may be disposed in the single video communication terminal to decode the three channels of video code streams.

In the embodiment, alternatively, a video communication terminal may be used to receive and decode the three channels of video code streams. The advantage of the method is that synchronization of the multi-channel video data is easy to achieve, and the structure of the whole video communication system may be optimized, but the method requires that the video communication terminal has greater decoding processing capacity.

Step 311: The receiving end performs GAMMA correction on the at least two channels of video data according to the GAMMA correction parameter among the second video processing parameters.

Similar to that at the transmitting end, before processing the obtained video data, the display fusing apparatus is required to check whether video display parameters required for processing the video data are already set. If the parameters are not set, the three channels of video data undergoes transparent transmission. That is, the video data is not processed, and is output to a display device directly. If the parameters are already set, the video data processing is performed.

In the embodiment, the display fusing apparatus deliver the output three channels of video data to the three projectors for display. Internal differences of the projectors and differences between the projectors may cause the three channels of video data to be different in brightness and color, so that before the video data is displayed, the projector GAMMA correction needs to be performed on the data in the display fusing apparatus.

The differences between the projectors in brightness and color may be corrected by using a shooting feedback method. A template image of three color components RGB of grades 0 to 255 is projected, which is compared with color components RGB of the three channels of panoramic images, so as to establish curves of brightness and color differences between the three projectors. The GAMMA correction between the projectors is described below in detail. It is assumed that P1 and P2 are two different projectors. As shown in FIG. 16, abscissas are color grades of the component R of a template image, have a range of 0 to 255; the ordinate is the color component R of two channels of data among the video data, and may be regarded as a function f(R) of the component R of the template image. In this way, a curve of a color component R of each projector may be established, and for grades of 0 to 255, a difference value Δf of the component R of the two projectors may be calculated. The variant may be regarded as the function of the component R of the template image. In this way, a chroma curve of the color component R of one projector may server as a reference, and the chroma curve of the color component R of the other projector may be adjusted, so that the color component R of the two channels of panoramic images to be displayed by the two projectors is consistent. The method for processing the other two color components G and B is the same, and is not repeated herein.

The differences between the projectors in internal brightness and color may also be corrected by using a method similar to the above method. An example is taken, in which a projector projects one channel of video data among the three channels of video data. The one channel of video data is divided into blocks first, and then a curve of differences in brightness and color is established for each divided data. The method for establishing the curve of differences between the projectors in brightness and color may serve as a reference for a specific implementation method, which is not repeated herein.

In order to achieve a better projection effect, besides the correction of the differences between the projectors and within the projectors in brightness and color, light leakage compensation of the projector needs to be performed. Light leakage occurs when a projector projects a pure black image, so that the image obtained by projection is not purely black, and has some degree of brightness, and therefore, the brightness of the three channels of video data in the overlapping area is not the same as that in the non-overlapping area. A difference between the brightness in the overlapping area and that in the non-overlapping area is calculated, and a calculated brightness value is added to the non-overlapping area, so that the brightness of the overlapping area and that of the non-overlapping area are the same.

Step 312: The receiving end performs projection correction on the at least two channels of video data according to the projection correction parameter among the second video processing parameters.

In the embodiment, the display apparatuses may be the projectors and the screen, so that when the screen is an arc screen, or an oval screen or a parabolic screen, the effect of the shape of the screen on the displayed image has to be taken into account. That is, when the video data is projected on the screen of the above shape, deformation may occur, so that projection correction needs to be performed.

Step 313: The receiving end performs transformation on the at least two channels of video data according to the transformation parameter among the second video processing parameters.

In the embodiment, the transformation includes at least one of video data translation, video data rotation and video data homographic transformation. The video data transformation in the step may be used to compensate for image deformation and misalignment caused by inaccurate placement of the projector. The method for performing the transformation on the image at the transmitting end may serve as a reference for a specific transformation method, and specific principles are not described herein.

Step 314: The receiving end fuses the at least two channels of video data according to the fusion parameter among the second video processing parameters.

In the embodiment, the objective of the image fusion is that no obvious difference in brightness between the two pieces of video data at the joint occurs. A specific method is as follows. First, an overlapping area is created at the joint of the two pieces of video data, and then the Alpha fusion is performed on the overlapping area. Preferably, a non-linear Alpha fusion method is employed. For example, a formula employed by the non-linear Alpha fusion is:

$$Alpha(x) = \left(\frac{1}{2} + \frac{1}{2}\cos\theta x\right)^{\frac{1}{\gamma}}$$

$$Alpha(x) = \left(\frac{1}{2} - \frac{1}{2}\cos\theta x\right)^{\frac{1}{\gamma}}$$

formula (10)

where θ is an angle value, γ is a GAMMA value, and an optimal fusion effect may be obtained by adjusting θ and γ.

Step 315: The receiving end trims the ratio of the fused at least two channels of video data into a second target ratio according to the area trimming parameter in the second video processing parameters.

In the embodiment, in order to make the display manner of the video conference system in the prior art to be compatible, the display fusing apparatus may be further connected to three high definition flat panel displays besides the projectors. However, the flat panel displays each have a border thickness, thereby failing to achieve seamless display. Therefore, the part, at the border thickness, of the image needs to be trimmed off. The second target ratio is determined according to the border thickness of the display. A boarder width of the display is defined by the user. The adjustment correction software on the PC device converts the boarder width in millimeter unit of a flat panel display into a width in pixel unit according to the size and resolution of the flat panel display. The display fusing apparatus trims each video data according to the calculated display boarder width, so as to generate a trimmed image.

Step 316: The receiving end scales the size of the fused at least two channels of video data to second target size.

In the embodiment, after the video data is trimmed, the size of the video data may become smaller, so that the video data is scaled to enable the size thereof to reach the size required for display.

Step 317: The receiving end outputs the fused at least two channels of video data to the display apparatuses, so that the display apparatuses display the fused at least two channels of video data.

In the embodiment, the display apparatuses include projectors and a screen. The screen may be an arc screen, or an oval screen, or a parabolic screen, or a polygon face screen, or a straight screen. The number of the display apparatuses is not smaller than 2. In the embodiment, three projectors are disposed to project and display the three channels of video data. Definitely, the video data may be one-channel, that is, the panoramic video image is not segmented at the transmitting end, and in this case only one projector or only one display may be employed to display the obtained one channel of video data, but the display effect is poor.

Preferably, in the embodiment, an arc screen is used as the projection screen. The oval screen and the parabolic screen are similar to the arc screen, and differences are as follows. Because the geometric shape of the projection screen changes, the algorithm described in step 304 needs to be modified accordingly. When the polygon face screen or the straight screen is used as the screen, no distortion occurs in the video data on planar projection, so that no geometric correction processing on the video data is required. Further, polygon face screens may employ obtuse angle transition, or may employ fillet transition. The fillet transition is more natural than the obtuse angle transition. As the radius of the fillet increases, the transition effect becomes better. However, at the fillet of transition, geometric correction processing needs to be performed on the video data. When the straight screen is used as the screen, the transformation processing performed on the image is the simplest. Further, according to the geometric shape of the screen, the shape of the conference table may be modified accordingly to obtain a better presence effect. For example, when the polygon face screen or the straight screen is employed, the conference table may be modified into a foldable table.

The video communication terminal is used in step 309 and step 310, and the structure of the video communication terminal is described below in detail.

When the video encoder and decoder are integrated in the video communication terminal, modules forming the video communication terminal include: an audio codec, configured to code or decode a received audio signal, where a codec standard may be G.711, or G.722, or G.723, or G.728 or G.729; a video codec, configured to code or decode a received video signal, where a codec standard may be H.261 or H.263; a system control unit, configured to provide signaling for correct operation of the video communication terminal, where the signaling includes call control, capability exchange, signaling of command and instruction and a message; and a formatting unit, configured to format audio, video, data and a control flow to be transmitted, so as to form a message output to the network interface, or extract audio, video, data and a control flow from a message received at the network interface. In addition, the unit also performs logical framing, sequence numbering, error detection and error correction on each media type.

In step 311 to step 315, the second video processing parameters need to be used. Before the video data is processed, the second video processing parameters need to be set first. The video data is processed according to the set parameters. A method for setting the second video processing parameters is described below in detail.

In the embodiment, the display fusing apparatus and the PC device may be combined. The PC device is also called a second processing device. The PC device calculates the second video processing parameters. The display fusing apparatus sets the second video processing parameters, and processes the video data according to the parameters. Alternatively, the display fusing apparatus directly calculates the second video processing parameters. That is, the display fusing apparatus directly performs the process of calculation, setting and video data processing without interacting with the PC device. Alternatively, one or more PC devices perform the process of calculation, setting and video data processing alone, without interacting with the display fusing apparatus.

Figure 17:
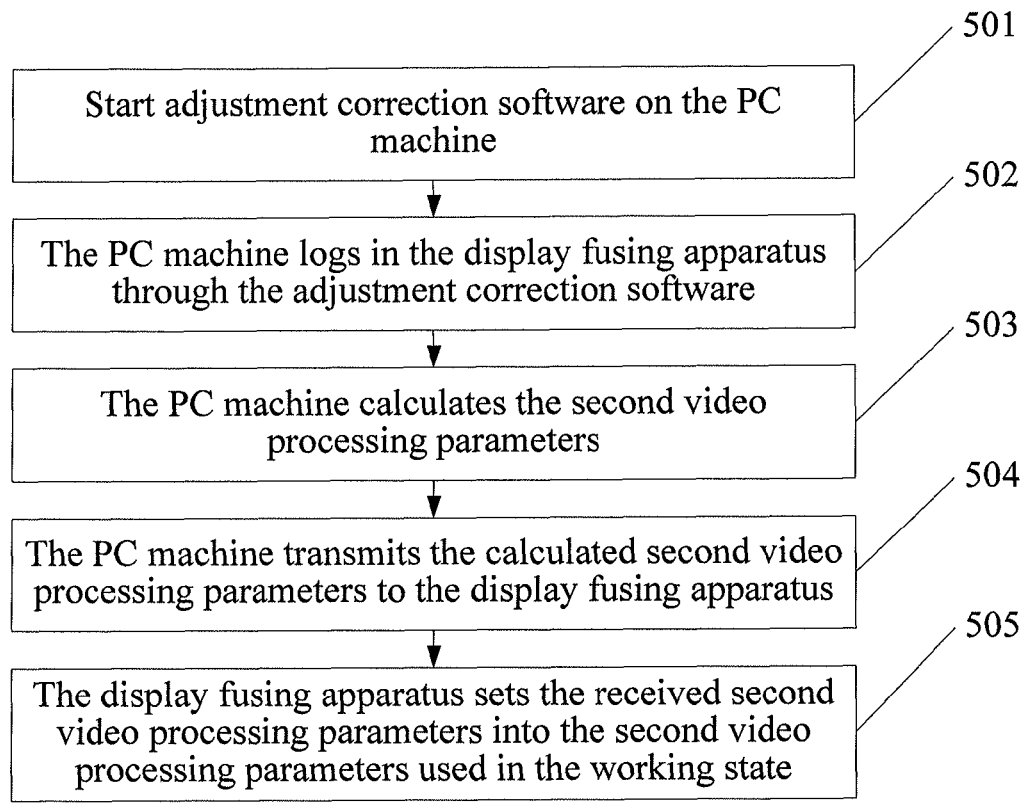
FIG. 17 is a flow chart of the setting of second video processing parameters at a receiving end in a video communication method provided by an embodiment of the present invention.
Figure 18:
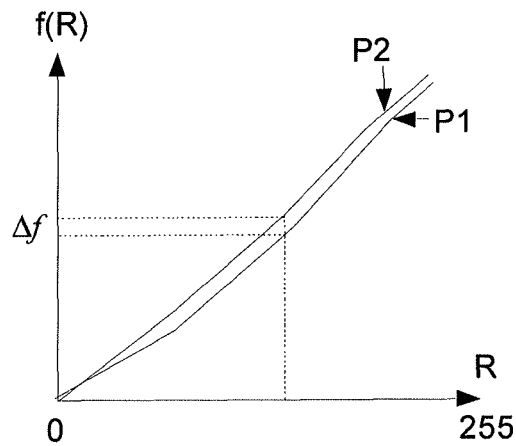
FIG. 18 shows curves of differences in brightness and color between receiving end projectors provided by an embodiment of the present invention.

When the display fusing apparatus and the PC device (also called the second processing device) are used together to perform calculation and setting of the video display parameters, the specific setting method may be implemented through steps shown in FIG. 17.

Step 501: Start adjustment correction software on the PC device.

The adjustment correction software is the same as the transmitting end adjustment correction software, and is not repeated herein.

Step 502: The PC device logs in the display fusing apparatus through the adjustment correction software.

Step 503: The PC device calculates the second video processing parameters.

In the embodiment, parameters calculated by the PC device include a projector GAMMA correction parameter, a video image projection correction parameter, a video image transformation parameter table, a video image Alpha fusion parameter table, and an image area trimming parameter.

Step 504: The PC device transmits the calculated second video processing parameters to the display fusing apparatus.

In the embodiment, a data transfer interface between the PC device and the display fusing apparatus may employ interfaces such as Ethernet and USB, and the transfer protocol may employ the FTP protocol, the HTTP protocol, the customized TCP protocol, or the UDP protocol for transmission. When the data volume of the calculated parameters is huge, the data transfer protocol is used for the transmission to the display splicing fusing apparatus.

In the embodiment, functions of the PC device further include transmitting a setting command to the display fusing apparatus. Similar to that the PC device transmits the setting command to the apparatus for shooting, stitching, and fusing, the ways for transmitting the setting command may be multiple, for example, transmitted through a serial port, a parallel port or a network interface. If transmission is performed through the network interface, the Telnet protocol may be employed, or the TCP protocol and the UDP protocol may be employed for transmission.

Step 505: The display fusing apparatus sets the received second video processing parameters to the second video processing parameters used in the working state.

In the embodiment, after the second video processing parameters are set, the three channels of video data may be processed according to steps 311 to 315, and the processed video data is displayed, as described in step 317. Therefore, the steps of the method at the video communication receiving end are completed.

In the video communication method provided by the embodiment of the present invention, the obtained at least two channels of video images are fused into a panoramic video image at the transmitting end of the video communication, and the fused panoramic video image can reflect a junction area position relationship between adjacent video images more realistically, so that the finally displayed image provides the user with more real panoramic experience, thereby solving the problem that adjacent video images shot by the video cameras have an overlapping or missing area at the junction thereof and are not consistent in brightness and color. At the video communication transmitting end in the embodiment of the present invention, after the panoramic video image is encoded into the video code stream to be transmitted to the video communication receiving end, the video communication receiving end performs further fusion processing on the video code stream, and outputs the video image after the fusion processing to the display apparatuses for display. The fusion processing performed by the video communication receiving end may enable multiple projected images to be presented on an arc screen seamlessly and differences between projection areas to be small in color and brightness, thereby improving visual continuity of the panoramic video image and providing the user with better immersive panoramic experience.

Figure 19:
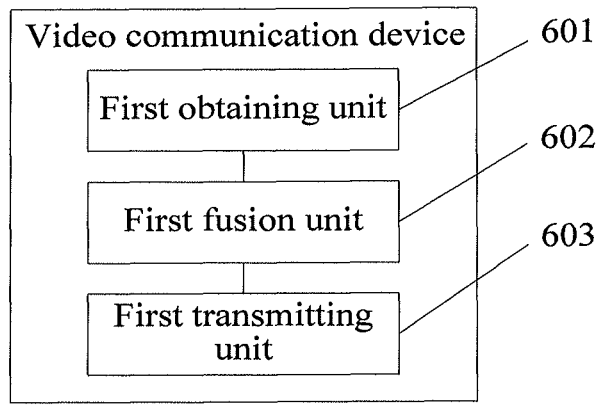
FIG. 19 is a first schematic structural diagram of a transmitting end video communication device provided by an embodiment of the present invention.

As shown in FIG. 19, an embodiment of the present invention further provides a video communication device. The video communication device is applied at a transmitting end of a video communication system, and includes:

a first obtaining unit 601, configured to obtain at least two channels of local video images;

a first fusion unit 602, configured to fuse, according to a fusion parameter among first video processing parameters, the at least two channels of local video images obtained by the first obtaining unit 601, so as to generate a panoramic video image; and a first transmitting unit 603, configured to transmit a panoramic video image obtained by the first fusion unit 602 to a video encoder, encode the panoramic video image into a video code stream through the video encoder, and transmit the video code stream to a remote end video communication site.

In the video communication device provided by the embodiment of the present invention, the first fusion unit fuses the at least two channels of video images obtained by the first obtaining unit into a panoramic video image. The fused panoramic video image can reflect a junction area position relationship between adjacent video images more realistically, so that the finally displayed image provides the user with more real panoramic experience, thereby solving the problem that adjacent video images shot by the video cameras have an overlapping or missing area at the junction thereof and are not consistent in brightness and color.

Figure 20:
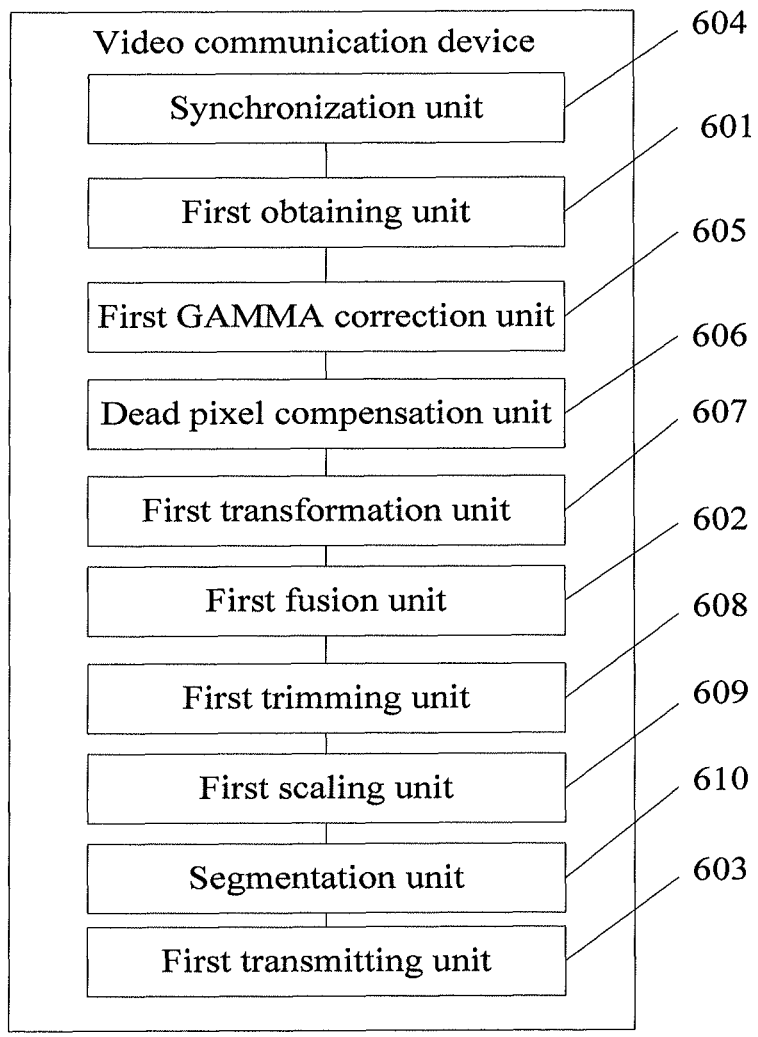
FIG. 20 is a second schematic structural diagram of a transmitting end video communication device provided by an embodiment of the present invention.

Further, as shown in FIG. 20, the video communication device further includes: a synchronization unit 604, a first GAMMA correction unit 605, a dead pixel compensation unit 606, a first transformation unit 607, a first trimming unit 608, a first scaling unit 609, and a segmentation unit 610.

The synchronization unit 604 is configured to provide a synchronization clock, so that the first obtaining unit 601 calibrated by the synchronization clock obtains the at least two channels of local video images.

The first GAMMA correction unit 605 is configured to perform GAMMA correction on the at least two channels of local video images obtained by the first obtaining unit 601 according to a GAMMA correction parameter among the first video processing parameters before the at least two channels of local video images obtained by the first obtaining unit 601 are fused.

In the embodiment, the apparatus for shooting, stitching, and fusing may receive the video images processed by the chassis of the co-optical-center video camera, and may also receive video images sent out by a co-optical-center video camera sensor that are not processed, such as a CCD or CMOS sensor. When the apparatus for shooting, stitching, and fusing receives the video images that are not processed, GAMMA correction and sensor dead pixel compensation processing need to be performed on the video images, so as to improve display quality of the video image.

The dead pixel compensation unit 606 is configured to perform sensor dead pixel compensation on the at least two channels of local video images obtained by the first obtaining unit 601 according to a dead pixel compensation parameter among the first video processing parameters before the at least two channels of local video images obtained by the first obtaining unit 601 are fused.

In the embodiment, if a sensor outputting a video image has a dead pixel, the video image also has a dead pixel. In the dead pixel compensation processing, a pixel value at the dead pixel may be obtained according to differences of values of pixels adjacent to the dead pixel on the video image, so as to eliminate the dead pixel on the video image and improve display quality of the video image.

The first transformation unit 607 is configured to perform transformation on the at least two channels of local video images according to a transformation parameter among the first video processing parameters before the at least two channels of local video images obtained by the first obtaining unit 601 are fused. The transformation includes at least one of video image translation, video image rotation, video image homographic transformation, and video image cylindrical transformation.

The first trimming unit 608 is configured to trim a ratio of a panoramic video image obtained by the first fusion unit 602 into a first target ratio according to an area trimming parameter among first video processing parameters after the at least two channels of local video images obtained by the first obtaining unit 601 are fused.

In the embodiment, the objective of the image trimming is to remove a part, which does not need to be displayed, of the image. The first target ratio is determined manually according to an actual situation.

The first scaling unit 609 is configured to scale the size of a panoramic video image obtained by the first fusion unit 602 to first target size after the at least two channels of local video images obtained by the first obtaining unit 601 are fused.

In the embodiment, after the video image is trimmed, the size of the video image may become smaller, so that the video image is scaled to enable the size thereof to reach the size required by the user. The first target size is determined manually according to an actual situation.

The segmentation unit 610 is configured to segment a panoramic video image obtained by the first fusion unit 602 into at least two channels of video data after the at least two channels of local video images obtained by the first obtaining unit 601 are fused.

In the embodiment, the fused panoramic video image is segmented into three channels of video data output to three video communication terminals, so as to increase the data processing speed and decrease the error rate.

Figure 21:
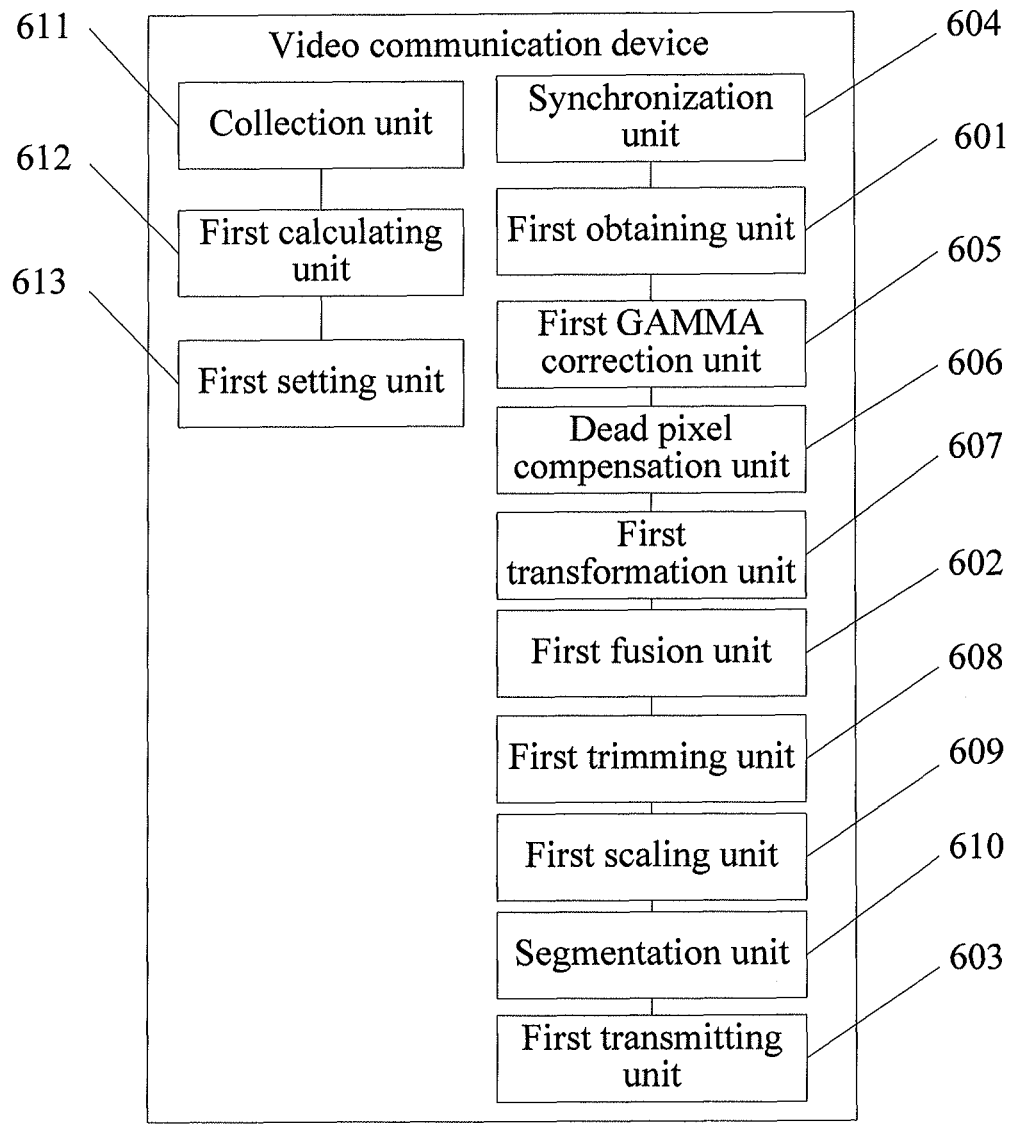
FIG. 21 is a third schematic structural diagram of a transmitting end video communication device provided by an embodiment of the present invention.

Further, as shown in FIG. 21, when the communication device is not required to interact with the PC device, the communication device further includes:

a first collection unit 611, configured to collect at least two images;

a first calculating unit 612, configured to calculate first video processing parameters according to the at least two images collected by the first collection unit 611; and a first setting unit 613, configured to set the first video processing parameters calculated by the first calculating unit 612 to first video processing parameters used in a working state.

Figure 22:
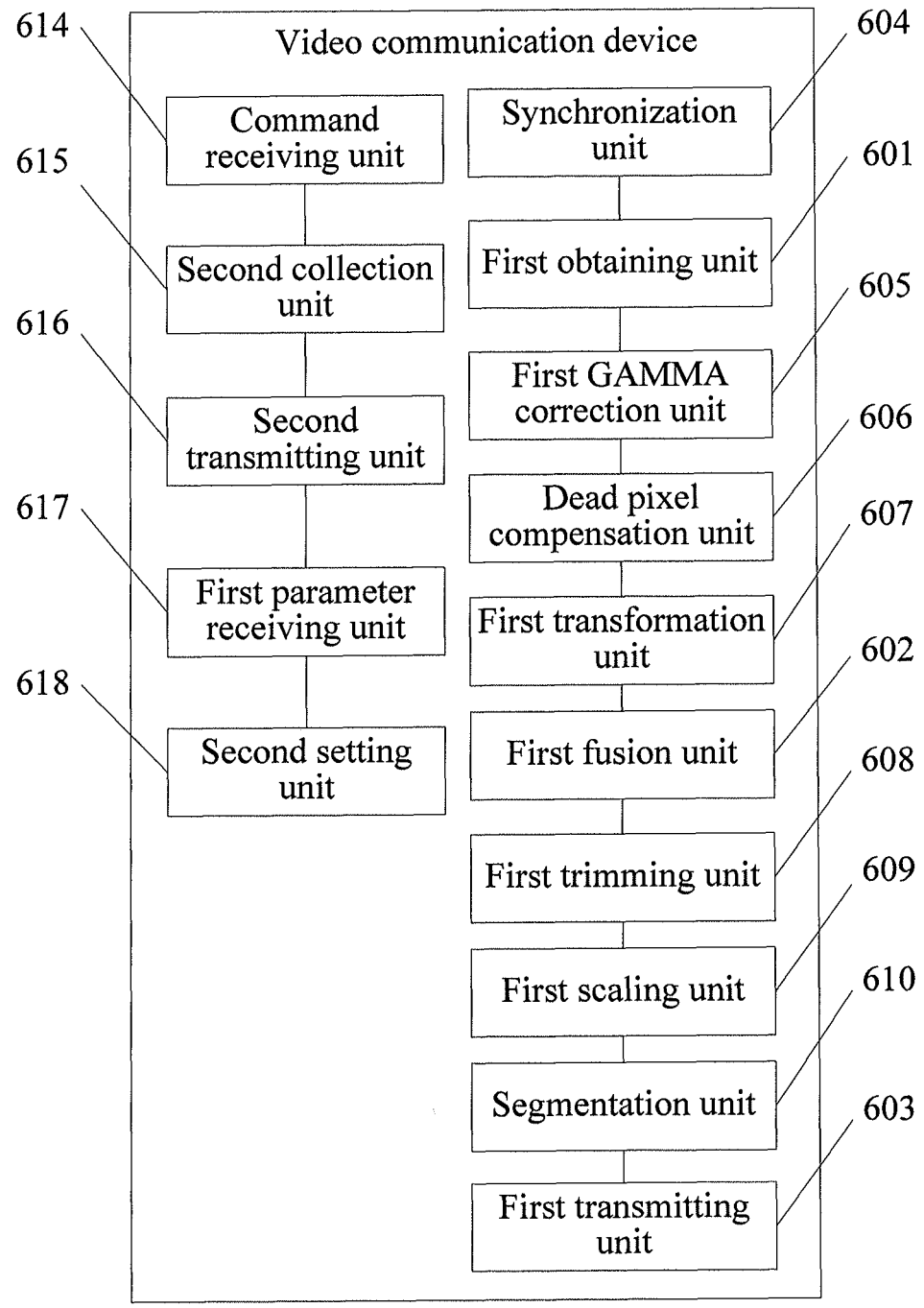
FIG. 22 is a fourth schematic structural diagram of a transmitting end video communication device provided by an embodiment of the present invention.

Further, as shown in FIG. 22, when the communication device is required to interact with the PC device, the communication device further includes:

a command receiving unit 614, configured to receive an image collection command transmitted by a first processing device;

a second collection unit 615, configured to collect at least two images;

a second transmitting unit 616, configured to transmit the at least two images collected by the second collection unit 615 to the first processing device;

the first parameter receiving unit 617, configured to receive first video processing parameters calculated, according to the at least two images collected by the second collection unit 615, by the first processing device; and a second setting unit 618, configured to set the first video processing parameters received by the first parameter receiving unit 617 to first video processing parameters used in a working state.

The video communication method provided by the embodiment of the present invention may serve as a reference for a specific implementation method of the video communication device provided by the embodiment of the present invention, which is not repeated herein.

Figure 23:
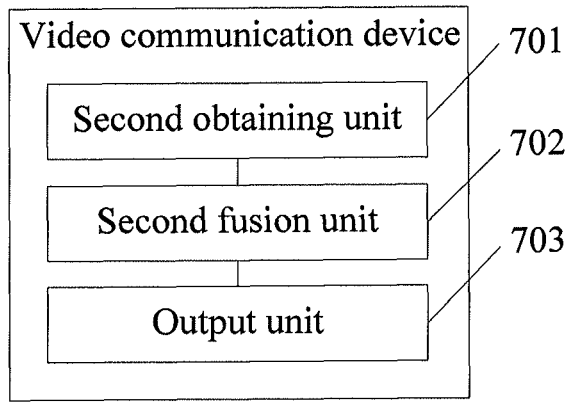
FIG. 23 is a first schematic structural diagram of a receiving end video communication device provided by an embodiment of the present invention.

As shown in FIG. 23, an embodiment of the present invention further provides a video communication device. The video communication device is applied at a receiving end of a video communication system, and includes:

a second obtaining unit 701, configured to obtain at least two channels of video data, which is decoded by a video decoder from a video code stream, where the video code stream is received by the video decoder from a video communication site at a remote end;

a second fusion unit 702, configured to fuse, according to a fusion parameter among second video processing parameters, the at least two channels of video data obtained by the second obtaining unit 701; and an output unit 703, configured to output the at least two channels of video data fused by the second fusion unit 702 to display apparatuses, so that the display apparatuses display the fused at least two channels of video data.

In the video communication device provided by the embodiment of the present invention, the video code stream transmitted by the video communication transmitting end is received and decoded. The second fusion unit performs further fusion processing on the video data obtained by the decoding. The output unit outputs the fused video image to the display apparatuses for display. The fusion processing performed by the video communication receiving end may enable multiple projected images to be presented on an arc screen seamlessly and differences between projection areas to be small in color and brightness, thereby improving visual continuity of the panoramic video image and providing the user with better immersive panoramic experience.

Figure 24:
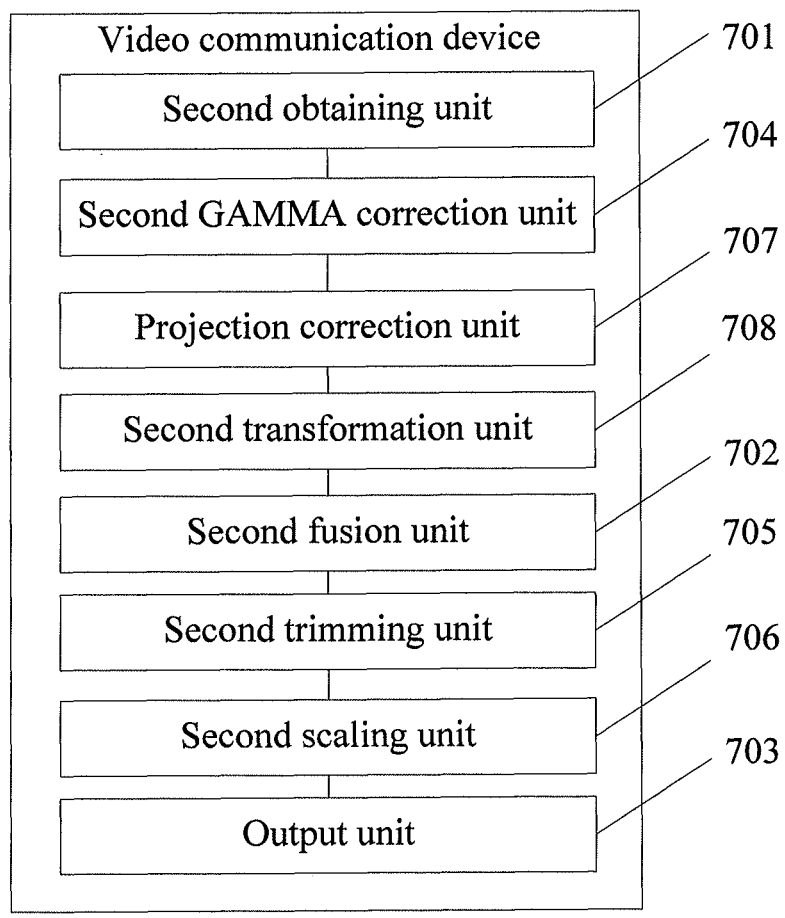
FIG. 24 is a second schematic structural diagram of a receiving end video communication device provided by an embodiment of the present invention.

Further, as shown in FIG. 24, the video communication device further includes: a second GAMMA correction unit 704, a projection correction unit 707, a second transformation unit 708, a second trimming unit 705 and a second scaling unit 706.

The second GAMMA correction unit 704 is configured to perform, according to a GAMMA correction parameter among the second video processing parameters, GAMMA correction on the at least two channels of video data obtained by the second obtaining unit 701 before the at least two channels of video data obtained by the second obtaining unit 701 is fused.

In the embodiment, the GAMMA correction may be performed on differences between the projectors and within the projector in brightness and color through a shooting feedback method, so as to eliminate the influence exerted by the projectors on the display effect of the video image.

The projection correction unit 707 is configured to perform, according to a projection correction parameter among the second video processing parameters, projection correction on the at least two channels of video data obtained by the second obtaining unit 701 before the at least two channels of video data obtained by the second obtaining unit 701 is fused.

The second transformation unit 708 is configured to perform transformation on the at least two channels of video data according to a transformation parameter among the second video processing parameters before the at least two channels of video data obtained by the second obtaining unit 701 is fused. The transformation includes at least one of: video data translation, video data rotation, and video data homographic transformation.

The image transformation in the step may be used to compensate for image deformation and misalignment caused by inaccurate placement of the projector.

The second trimming unit 705 is configured to trim a ratio of the at least two channels of video data fused by the second fusion unit 702 into a second target ratio according to an area trimming parameter among the second video processing parameters after the at least two channels of video data obtained by the second obtaining unit 701 is fused.

In the embodiment, in order to make the display manner of the video conference system in the prior art to be compatible, the display fusing apparatus may be further connected to three high definition flat panel displays besides the projectors. However, the flat panel displays each have a border thickness, thereby failing to achieve seamless display. Therefore, the part, at the border thickness, of the image needs to be trimmed off. The second target ratio is determined according to the border thickness of the display.

The second scaling unit 706 is configured to scale the size of the at least two channels of video data fused by the second fusion unit 702 to second target size after the at least two channels of video data obtained by the second obtaining unit 701 is fused.

In the embodiment, after the video data is trimmed, the size of the video data may become smaller, so that the video data is scaled to enable the size thereof to reach the size required for display.

Figure 25:
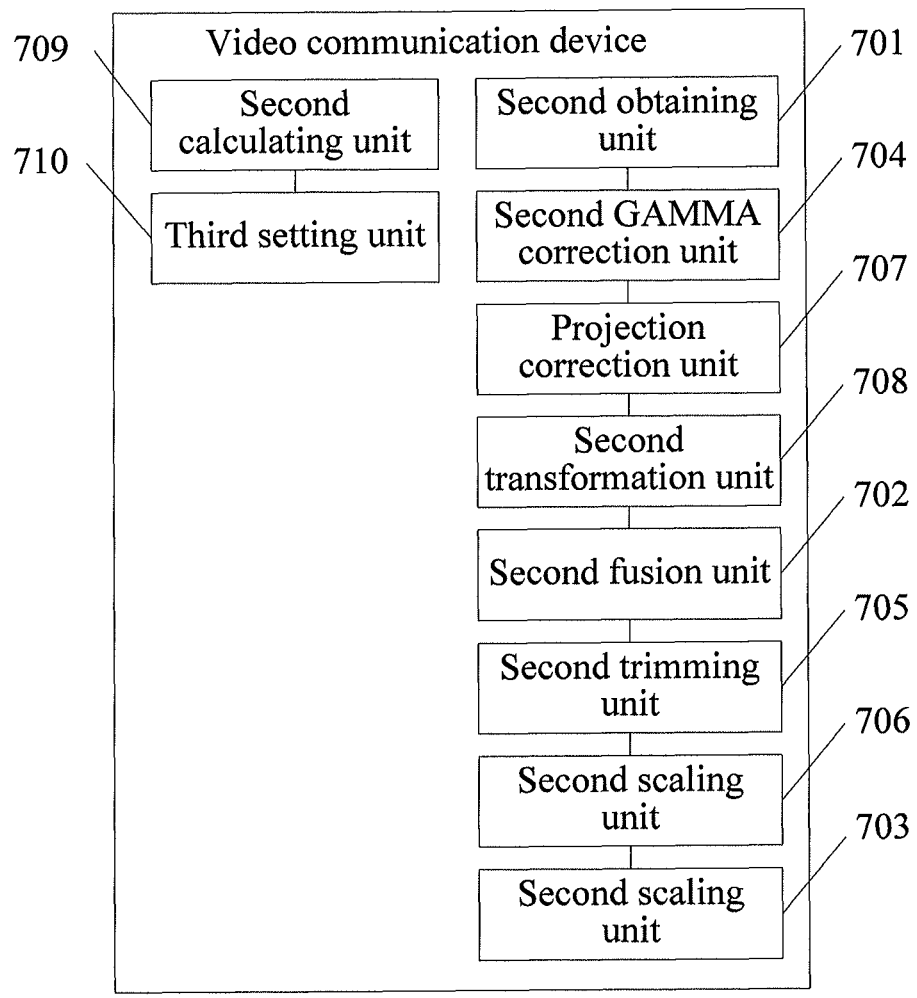
FIG. 25 is a third schematic structural diagram of a receiving end video communication device provided by an embodiment of the present invention.

Further, as shown in FIG. 25, when the communication device is not required to interact with the PC device, the communication device further includes: a second calculating unit 709 and a third setting unit 710.

The second calculating unit 709 is configured to calculate second video processing parameters.

The second video processing parameters include a projector GAMMA correction parameter, a video image projection correction parameter, a video image transformation parameter table, a video image Alpha fusion parameter table and an image area trimming parameter.

The third setting unit 710 is configured to set the second video processing parameters calculated by the second calculating unit 709 to second video processing parameters used in a working state.

Figure 26:
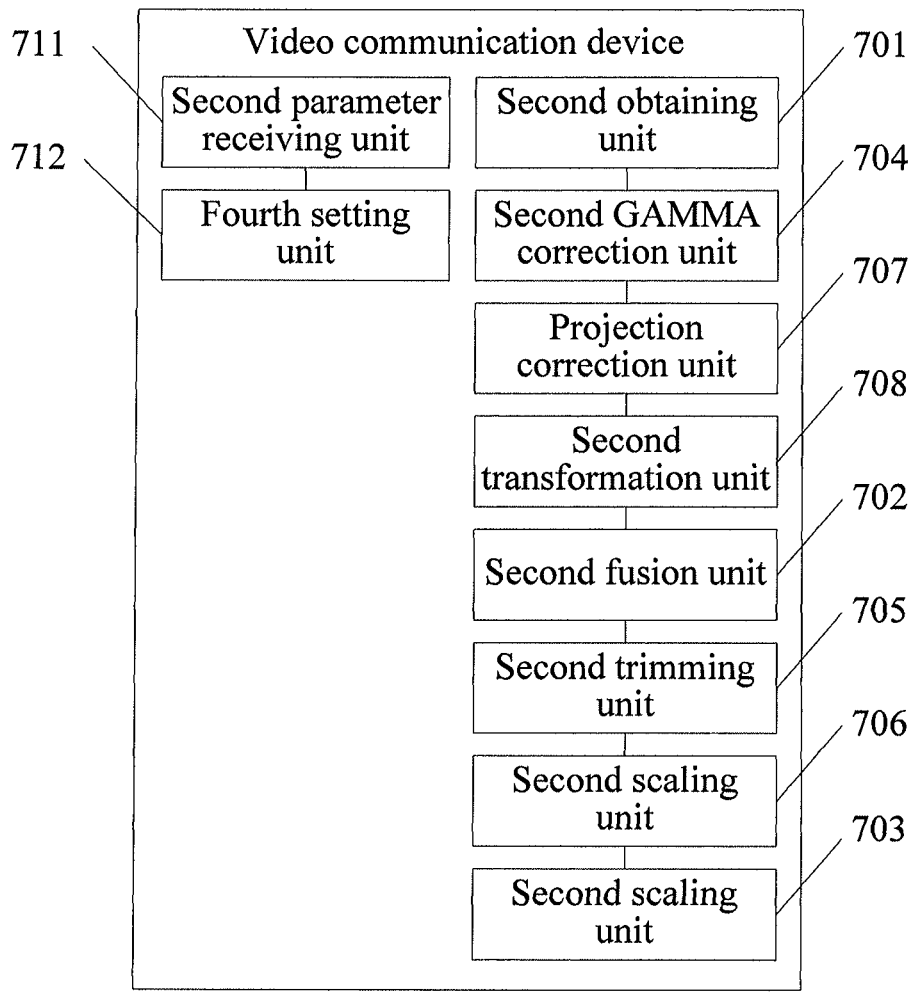
FIG. 26 is a fourth schematic structural diagram of a receiving end video communication device provided by an embodiment of the present invention.

Further, as shown in FIG. 26, when the communication device is required to interact with the PC device, the communication device further includes:

a second parameter receiving unit 711, configured to receive second video processing parameters calculated by a second processing device, where in the embodiment, the parameters calculated by the second processing device include a projector GAMMA correction parameter, a video image projection correction parameter, a video image transformation parameter table, a video image Alpha fusion parameter table and an image area trimming parameter; and a fourth setting unit 712, configured to set the second video processing parameters received by the second parameter receiving unit 711 to second video processing parameters used in a working state.

The video communication method provided by the embodiment of the present invention may serve as a reference for a specific implementation method of the video communication device provided by the embodiment of the present invention, which is not repeated herein.

The technical solutions provided by the embodiments of the present invention may be applied in the technical field of video communication, such as a video conference.

Persons of ordinary skill in the art should understand that, all of or a part of the steps in the method according to the embodiments may be implemented by a program instructing relevant hardware. The program may be stored in a computer readable storage medium, such as a ROM/RAM, a magnetic disk, or an optical disk.

The above descriptions are merely specific embodiments of the present invention, and the protection scope of the present invention is not limited thereto. Any modification or replacement that can be easily figured out by persons skilled in the art within the technical scope of the present invention shall fall within the protection scope of the present invention. Therefore, the protection scope of the present invention is defined by the claims.

What is claimed is:

1. A video communication site, comprising:
   at least two local video cameras, configured to direct at least two local user parts, and shoot at least two channels of local video images of the local user parts;
   an apparatus for local shooting, stitching, and fusing, configured to fuse the shot at least two channels of local video images of the local user parts according to a fusion parameter among first video processing parameters to generate a panoramic video image; and encode the panoramic video image into a video code stream, and transmit the video code stream to a video communication site at a remote end;
   a local display fusing apparatus, configured to obtain at least two channels of video data by decoding a video code stream received from the remote end, fuse the obtained at least two channels of video data according to a fusion parameter among second video processing parameters, and output the fused at least two channels of video data to at least two local display apparatuses; and
   the at least two local display apparatuses are configured to display the at least two channels of video data fused by the local display fusing apparatus, wherein:
   a shooting area of the at least two local video cameras is a union of shooting ranges of the at least two local video cameras, and the shooting area of the at least two local video cameras covers the at least two local user parts,
   the at least two local video cameras are co-optical-center video cameras; and each of the at least two local display apparatuses comprises a projector and a projection screen or displays, and
   each of the at least two local display apparatuses is a projector and a projection screen, a position of the projection screen is arranged by using a point at a midline position of an edge of a conference table as the center of a circle, and one of the co-optical-center video cameras is at a midline position specified by an arc length of the projection screen.

2. The video communication site according to claim 1, wherein the apparatus for local shooting, stitching, and fusing is further configured to perform at least one of the following operations on the at least two channels of local video images of the local user parts: GAMMA correction, sensor dead pixel compensation, and image processing related transformation;

the apparatus for local shooting, stitching, and fusing is further configured to perform at least one of the following operations on the panoramic video image: trimming, scaling and segmentation.

3. The video communication site according to claim 1, wherein the local display fusing apparatus is further configured to perform at least one of the following operations on the at least two channels of video data obtained by decoding: GAMMA correction, projection correction and transformation;

the local display fusing apparatus is further configured to perform at least one of the following operations on the fused at least two channels of video data:

trimming and scaling.

4. The video communication site according to claim 1, wherein each of the at least two local display apparatuses comprises at least one display apparatus configured to display shared data information; or a system further comprises another local display apparatus, which is configured to display the shared data information.

5. A video communication system, comprising at least two video communication sites according to claim 1; wherein one of the at least two video communication sites is configured to:

shoot at least two channels of local video images of local user parts utilizing at least two respective local co-optical-center video cameras;

fuse the shot at least two channels of local video images of the local user parts according to a fusion parameter among first video processing parameters to generate a panoramic video image; and encode the panoramic video image into a video code stream, and transmit the video code stream through a network to a remote end; and at least one of the at least two video communication sites acts as a receiving site, and is configured to:

obtain at least two channels of video data by decoding the received video code stream, fuse the obtained at least two channels of video data according to a fusion parameter among second video processing parameters, and output the fused at least two channels of video data for display on at least two local display apparatuses, wherein:

each of the at least two local display apparatuses comprises a projector and a projection screen, a position of the projection screen is arranged by using a point at a midline position of an edge of a conference table as the center of a circle, and one of the at least two respective co-optical-center video cameras is at a midline position specified by an arc length of the projection screen.

6. A video communication method, comprising:

obtaining at least two channels of local video images from at least two local co-optical-center video cameras;

fusing the at least two channels of local video images according to a fusion parameter among first video processing parameters, so as to generate a panoramic video image; and transmitting the panoramic video image to a video encoder, encoding the panoramic video image into a video code stream through the video encoder, and transmitting the video code stream to a remote end;

at least two local display apparatuses are configured to display at least two channels of video data which are fused by a local display fusing apparatus after decoding a video code stream received from the remote end, wherein:

each of the at least two local display apparatuses comprises a projector and a projection screen, a position of the projection screen is arranged by using a point at a midline position of an edge of a conference table as the center of a circle, and one of the co-optical-center video cameras is at a midline position specified by an arc length of the projection screen.

7. The video communication method according to claim 6, wherein the obtaining the at least two channels of local video images comprises: obtaining the at least two channels of local video images through at least two local video cameras and according to a synchronization clock.

8. The video communication method according to claim 6, wherein the method further comprises:

before the fusing the at least two channels of local video images, performing GAMMA correction on the at least two channels of local video images according to a GAMMA correction parameter among the first video processing parameters; and/or before the fusing the at least two channels of local video images, performing sensor dead pixel compensation on the at least two channels of local video images according to a dead pixel compensation parameter among the first video processing parameters.

9. The video communication method according to claim 6, wherein the method further comprises:

before the fusing the at least two channels of local video images, performing image processing related transformation on the at least two channels of local video images according to a transformation parameter among the first video processing parameters, wherein the image processing related transformation comprises at least one of: video image translation, video image rotation, video image homographic transformation, and video image cylindrical transformation.

10. The video communication method according to claim 6, wherein the method further comprises:

after the fusing the at least two channels of local video images, trimming a ratio of the panoramic video image into a first target ratio according to an area trimming parameter among the first video processing parameters; and/or after the fusing the at least two channels of local video images, scaling the size of the panoramic video image to first target size.

11. The video communication method according to claim 6, wherein the method further comprises:

after the fusing the at least two channels of local video images, segmenting the panoramic video image into at least two channels of video data; and the encoding the panoramic video image into the video code stream through the video encoder and transmitting the video code stream comprises: encoding the at least two channels of video data into corresponding video code streams through at least two video encoders, and transmitting the video code streams corresponding to the at least two channels of video data.

12. The video communication method according to claim 6, further comprising: setting the first video processing parameters; wherein the setting the first video processing parameters comprises:

collecting at least two images;

calculating the first video processing parameters according to the at least two images; and setting the calculated first video processing parameters to first video processing parameters used in a working state.

13. The video communication method according to claim 6, wherein the step of setting the first video processing parameters comprises:
receiving an image collection command transmitted by a first processing device;
collecting at least two images;
transmitting the collected at least two images to the first processing device;
receiving the first video processing parameters, which are calculated by the first processing device according to the at least two images; and
setting the received first video processing parameters to first video processing parameters used in a working state.

14. A video communication method, comprising:
obtaining at least two channels of video data, which is decoded by a video decoder from a video code stream, wherein the video code stream is received by the video decoder from a video communication site at a remote end;
fusing the at least two channels of video data according to a fusion parameter among second video processing parameters; and
outputting the fused at least two channels of video data to at least two local display apparatuses, so that the at least two local display apparatuses display the fused at least two channels of video data, wherein
each of the at least two local display apparatuses comprises a projector and a projection screen, a position of the projection screen is arranged by using a point at a midline position of an edge of a conference table as the center of a circle, and a co-optical-center video camera is at a midline position specified by an arc length of the projection screen, wherein at least two co-optical-center video cameras are utilized to obtain at least two channel of local video images.

15. The video communication method according to claim 14, wherein the method further comprises:
before the fusing the at least two channels of video data, performing GAMMA correction on the at least two channels of video data according to a GAMMA correction parameter among the second video processing parameters.

16. The video communication method according to claim 14, wherein the method further comprises:
before the fusing the at least two channels of video data, performing projection correction on the at least two channels of video data according to a projection correction parameter among the second video processing parameters.

17. The video communication method according to claim 14, wherein the method further comprises:
before the fusing the at least two channels of video data, performing transformation on the least two channels of video data according to a transformation parameter among the second video processing parameters, wherein the transformation comprises at least one of: video data translation, video data rotation, video data homographic transformation, and video image cylindrical transformation.

18. The video communication method according to claim 14, wherein the method further comprises:
after the fusing the at least two channels of video data, trimming a ratio of the fused at least two channels of video data into a second target ratio according to an area trimming parameter among the first video processing parameters;
and/or
after the fusing the at least two channels of video data, scaling the size of the fused at least two channels of video data to second target size.

19. The video communication method according to claim 14, further comprising: setting the second video processing parameters; wherein
the setting the second video processing parameters comprises:
calculating the second video processing parameters or receiving the second video processing parameters calculated by a second processing device; and
setting the received second video processing parameters to second video processing parameters used in a working state.

20. A video communication device, comprising:
a first obtaining unit, configured to obtain at least two channels of local video images from at least two respective local co-optical-center video cameras;
a first fusion unit, configured to fuse, according to a fusion parameter among first video processing parameters, the at least two channels of local video images obtained by the first obtaining unit, so as to generate a panoramic video image; and
a first transmitting unit, configured to transmit a panoramic video image obtained by the first fusion unit to a video encoder, encode the panoramic video image into a video code stream through the video encoder, and transmit the video code stream to a remote end,
at least two local display apparatuses are configured to display at least two channels of video data which are fused by a local display fusing apparatus after decoding a video code stream received from the remote end, wherein:
each of the at least two local display apparatuses comprises a projector and a projection screen, a position of the projection screen is arranged by using a point at a midline position of an edge of a conference table as the center of a circle, and one of the at least two respective co-optical-center video cameras is at a midline position specified by an arc length of the projection screen.

21. The video communication device according to claim 20, wherein the device further comprises: a synchronization unit, configured to provide a synchronization clock, so that the first obtaining unit calibrated by the synchronization clock, obtains the at least two channels of local video images.

22. The video communication device according to claim 20, wherein the device further comprises:
a first GAMMA correction unit, configured to perform GAMMA correction on the at least two channels of local video images obtained by the first obtaining unit according to a GAMMA correction parameter among the first video processing parameters before the at least two channels of local video images obtained by the first obtaining unit are fused; and/or
a dead pixel compensation unit, configured to perform sensor dead pixel compensation on the at least two channels of local video images obtained by the first obtaining unit according to a dead pixel compensation parameter among the first video processing parameters before the at least two channels of local video images obtained by the first obtaining unit are fused.

23. The video communication device according to claim 20, wherein the device further comprises:
- a first transformation unit, configured to perform image processing related transformation on the at least two channels of local video images according to a transformation parameter among the first video processing parameters before the at least two channels of local video images obtained by the first obtaining unit are fused, wherein the image processing related transformation comprises at least one of: video image translation, video image rotation, video image homographic transformation, and video image cylindrical transformation.

24. The video communication device according to claim 20, wherein the device further comprises:
- a first trimming unit, configured to trim a ratio of a panoramic video image obtained by the first fusion unit into a first target ratio according to an area trimming parameter among first video processing parameters after the at least two channels of local video images obtained by the first obtaining unit are fused; and/or
- a first scaling unit, configured to scale the size of the panoramic video image obtained by the first fusion unit to first target size after the at least two channels of local video images obtained by the first obtaining unit are fused.

25. The video communication device according to claim 20, wherein the device further comprises:
- a segmentation unit, configured to segment a panoramic video image obtained by the first fusion unit into at least two channels of video data after the at least two channels of local video images obtained by the first obtaining unit are fused.

26. The video communication device according to claim 20, wherein the device further comprises:
- a first collection unit, configured to collect at least two images;
- a first calculating unit, configured to calculate the first video processing parameters according to the at least two images collected by the first collection unit; and
- a first setting unit, configured to set the first video processing parameters calculated by the first calculating unit to first video processing parameters used in a working state.

27. The video communication device according to claim 20, wherein the device further comprises:
- a command receiving unit, configured to receive an image collection command transmitted by a first processing device;
- a second collection unit, configured to collect at least two images;
- a second transmitting unit, configured to transmit the at least two images collected by the second collection unit to the first processing device;
- a first parameter receiving unit, configured to receive first video processing parameters calculated by the first processing device according to the at least two images collected by the second collection unit; and
- a second setting unit, configured to set the first video processing parameters received by the first parameter receiving unit to first video processing parameters used in a working state.

28. A video communication device, comprising:
- a second obtaining unit, configured to obtain at least two channels of video data, which is decoded by a video decoder from a video code stream, wherein the video code stream is received by the video decoder from a video communication site at a remote end;
- a second fusion unit, configured to fuse, according to a fusion parameter among second video processing parameters, the at least two channels of video data obtained by the second obtaining unit; and
- an output unit, configured to output the at least two channels of video data fused by the second fusion unit to at least two local display apparatuses, so that the at least two local display apparatuses display the fused at least two channels of video data, wherein
- each of the at least two local display apparatuses comprises a projector and a projection screen, a position of the projection screen is arranged by using a point at a midline position of an edge of a conference table as the center of a circle, and a co-optical-center video camera is at a midline position specified by an arc length of the projection screen, wherein at least two co-optical-center video cameras are utilized to obtain a channel of local video images.

29. The video communication device according to claim 28, wherein the device further comprises:
- a second GAMMA correction unit, configured to perform, according to a GAMMA correction parameter among the second video processing parameters, GAMMA correction on the at least two channels of video data obtained by the second obtaining unit before the at least two channels of video data obtained by the second obtaining unit is fused.

30. The video communication device according to claim 28, wherein the device further comprises:
- a projection correction unit, configured to perform, according to a projection correction parameter among the second video processing parameters, projection correction on the at least two channels of video data obtained by the second obtaining unit before the at least two channels of video data obtained by the second obtaining unit is fused.

31. The video communication device according to claim 28, wherein the device further comprises:
- a second transformation unit, configured to perform transformation on the at least two channels of video data according to a transformation parameter among the second video processing parameters before the at least two channels of video data obtained by the second obtaining unit is fused, wherein the transformation comprises at least one of: video data translation, video data rotation, video data homographic transformation, and video image cylindrical transformation.

32. The video communication device according to claim 28, wherein the device further comprises:
- a second trimming unit, configured to trim a ratio of the at least two channels of video data fused by the second fusion unit into a second target ratio according to an area trimming parameter among the second video processing parameters after the at least two channels of video data obtained by the second obtaining unit is fused; and/or
- a second scaling unit, configured to scale the size of the at least two channels of video data fused by the second fusion unit to second target size after the at least two channels of video data obtained by the second obtaining unit is fused.

33. The video communication device according to claim 28, wherein the device further comprises:
- a second calculating unit, configured to calculate the second video processing parameters; and a third setting unit, configured to set the second video processing parameters calculated by the second calculating unit to second video processing parameters used in a working state.

34. The video communication device according to claim 28, wherein the device further comprises:
a second parameter receiving unit, configured to receive the second video processing parameters calculated by a second processing device; and
a fourth setting unit, configured to set the second video processing parameters received by the second parameter receiving unit to second video processing parameters used in a working state.

* * * * *